US008670777B2

(12) United States Patent
Borran et al.

(10) Patent No.: US 8,670,777 B2
(45) Date of Patent: Mar. 11, 2014

(54) METHOD AND APPARATUS FOR FAST OTHER SECTOR INTERFERENCE (OSI) ADJUSTMENT

(75) Inventors: Mohammad Jaber Borran, San Diego, CA (US); Alexei Gorokhov, San Diego, CA (US); Aamod Khandekar, San Diego, CA (US); Tingfang Ji, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 967 days.

(21) Appl. No.: 11/849,595

(22) Filed: Sep. 4, 2007

(65) Prior Publication Data

US 2008/0117833 A1 May 22, 2008

Related U.S. Application Data

(60) Provisional application No. 60/843,291, filed on Sep. 8, 2006.

(51) Int. Cl.
*H04W 72/00* (2009.01)
(52) U.S. Cl.
USPC ........ 455/452.2; 455/420; 455/522; 455/453; 455/509
(58) Field of Classification Search
USPC .................................. 455/420, 522, 453, 509
See application file for complete search history.

(56) References Cited

U.S. PATENT DOCUMENTS

| 3,577,080 | A | 5/1971 | Cannalte |
| 4,225,976 | A | 9/1980 | Osborne et al. |
| 4,539,684 | A | 9/1985 | Kloker |
| 4,638,479 | A | 1/1987 | Alexis |
| 4,901,307 | A | 2/1990 | Gilhousen et al. |
| 4,908,827 | A | 3/1990 | Gates |
| 5,103,459 | A | 4/1992 | Gilhousen et al. |
| 5,267,262 | A | 11/1993 | Wheatley, III et al. |
| 5,301,364 | A | 4/1994 | Arens et al. |
| 5,396,516 | A | 3/1995 | Padovani et al. |

(Continued)

FOREIGN PATENT DOCUMENTS

| CA | 2340201 A1 | 1/2001 |
| CA | 2635291 A1 | 10/2007 |

(Continued)

OTHER PUBLICATIONS

International Search Report—PCT/US2007/077660, International Searching Authority—European Patent Office—Jan. 2, 2008.

(Continued)

*Primary Examiner* — Kwasi Karikari
(74) *Attorney, Agent, or Firm* — Jian Ma; Mary A. Fales

(57) ABSTRACT

Systems and methods that facilitate management of interference and communication resources are provided. A differential approach is devised in which other-sector interference (OSI) and communication resources are managed by adjusting an offset (delta) value associated with the resources in response to receiving an indication of other-sector interference. An OSI indication can be issued based on a short and a long time scale, and effective interference metrics over time-frequency resources. The adjusted delta value is communicated to a serving access point, which reassigns communication resources in order to mitigate other-sector interference.

32 Claims, 14 Drawing Sheets

(56) References Cited

U.S. PATENT DOCUMENTS

| | | |
|---|---|---|
| 5,406,613 A | 4/1995 | Peponidess et al. |
| 5,448,600 A | 9/1995 | Lucas |
| 5,469,471 A | 11/1995 | Wheatley, III et al. |
| 5,548,812 A | 8/1996 | Padovani et al. |
| 5,559,790 A | 9/1996 | Yano et al. |
| 5,574,984 A | 11/1996 | Reedd et al. |
| 5,606,727 A | 2/1997 | Ueda |
| 5,722,063 A | 2/1998 | Peterzelll et al. |
| 5,734,646 A | 3/1998 | I et al. |
| 5,754,533 A | 5/1998 | Bender et al. |
| 5,774,785 A | 6/1998 | Karlssonn et al. |
| 5,784,363 A | 7/1998 | Engstromm et al. |
| 5,815,507 A | 9/1998 | Vinggaardd et al. |
| 5,839,056 A | 11/1998 | Hakkinen |
| 5,859,383 A | 1/1999 | Davison et al. |
| 5,933,768 A | 8/1999 | Skoldd et al. |
| 5,956,642 A | 9/1999 | Larssonn et al. |
| 5,961,588 A | 10/1999 | Cooper et al. |
| 5,995,488 A | 11/1999 | Kalkunte et al. |
| 5,996,103 A | 11/1999 | Jahanghir |
| 5,996,110 A | 11/1999 | Kosmach |
| 6,006,073 A | 12/1999 | Glaunerr et al. |
| 6,012,160 A | 1/2000 | Dentt et al. |
| 6,038,220 A | 3/2000 | Kangg et al. |
| 6,044,072 A | 3/2000 | Ueda |
| 6,047,189 A | 4/2000 | Yunn et al. |
| 6,061,339 A | 5/2000 | Nieczyporowicz et al. |
| 6,075,974 A | 6/2000 | Saintss et al. |
| 6,101,179 A | 8/2000 | Soliman |
| 6,112,325 A | 8/2000 | Burshtein |
| 6,144,841 A | 11/2000 | Feeneyy et al. |
| 6,154,659 A | 11/2000 | Jalalii et al. |
| 6,173,187 B1 | 1/2001 | Salonaho et al. |
| 6,173,188 B1 | 1/2001 | Kim |
| 6,175,587 B1 | 1/2001 | Madhow et al. |
| 6,175,588 B1 | 1/2001 | Visotsky et al. |
| 6,181,738 B1 | 1/2001 | Chhedaa et al. |
| 6,188,678 B1 | 2/2001 | Prescottt et al. |
| 6,192,249 B1 | 2/2001 | Padovani |
| 6,208,699 B1 | 3/2001 | Chenn et al. |
| 6,212,364 B1 | 4/2001 | Park |
| 6,216,006 B1 | 4/2001 | Scholefield et al. |
| 6,226,529 B1 | 5/2001 | Bruno et al. |
| 6,233,222 B1 | 5/2001 | Wallentin |
| 6,397,070 B1 | 5/2002 | Black |
| 6,405,043 B1 | 6/2002 | Jensen et al. |
| 6,446,236 B1 | 9/2002 | McEwenn et al. |
| 6,449,463 B1 | 9/2002 | Schifff et al. |
| 6,519,705 B1 | 2/2003 | Leungg et al. |
| 6,532,563 B2 | 3/2003 | Nobelen |
| 6,539,065 B1 | 3/2003 | Furukawa |
| 6,553,231 B1 | 4/2003 | Karlsson et al. |
| 6,560,744 B1 | 5/2003 | Burshtein |
| 6,560,774 B1 | 5/2003 | Gordonn et al. |
| 6,574,211 B2 | 6/2003 | Padovanii et al. |
| 6,597,705 B1 | 7/2003 | Rezaiifarr et al. |
| 6,597,923 B1 | 7/2003 | Vanghii et al. |
| 6,597,932 B2 | 7/2003 | Tiann et al. |
| 6,603,746 B1 | 8/2003 | Larijanii et al. |
| 6,611,507 B1 | 8/2003 | Hottinenn et al. |
| 6,621,454 B1 | 9/2003 | Reudink et al. |
| 6,628,956 B2 | 9/2003 | Barkk et al. |
| 6,643,520 B1 | 11/2003 | Parkk et al. |
| 6,697,634 B1 | 2/2004 | Hayashii et al. |
| 6,711,150 B1 | 3/2004 | Vanghii et al. |
| 6,711,515 B1 | 3/2004 | Lehtinen et al. |
| 6,717,976 B1 | 4/2004 | Shenn et al. |
| 6,721,373 B1 | 4/2004 | Frenkell et al. |
| 6,744,743 B2 | 6/2004 | Waltonn et al. |
| 6,745,045 B2 | 6/2004 | Terry et al. |
| 6,751,444 B1 | 6/2004 | Meiyappann et al. |
| 6,763,244 B2 | 7/2004 | Chen et al. |
| 6,801,515 B1 | 10/2004 | Ishikawa et al. |
| 6,801,759 B1 | 10/2004 | Saifuddinn et al. |
| 6,807,164 B1 | 10/2004 | Almgrenn et al. |
| 6,895,245 B2 | 5/2005 | Wallentinn et al. |
| 6,950,669 B2 | 9/2005 | Simonssonn et al. |
| 6,952,591 B2 | 10/2005 | Budkaa et al. |
| 6,968,201 B1 | 11/2005 | Gandhii et al. |
| 6,977,912 B1 | 12/2005 | Porter et al. |
| 7,012,912 B2 | 3/2006 | Naguib et al. |
| 7,054,275 B2 | 5/2006 | Kim et al. |
| 7,058,421 B2 | 6/2006 | Ngai et al. |
| 7,072,315 B1 | 7/2006 | Liuu et al. |
| 7,103,316 B1 | 9/2006 | Hall |
| 7,145,935 B2 | 12/2006 | Won et al. |
| 7,158,450 B2 | 1/2007 | Wadaa et al. |
| 7,158,504 B2 | 1/2007 | Kadabaa et al. |
| 7,181,170 B2 | 2/2007 | Love et al. |
| 7,184,381 B2 | 2/2007 | Ohkuboo et al. |
| 7,197,692 B2 | 3/2007 | Sutivong et al. |
| 7,215,653 B2 | 5/2007 | Kimm et al. |
| 7,224,993 B2 | 5/2007 | Meyerss et al. |
| 7,254,158 B2 | 8/2007 | Agrawall et al. |
| 7,269,152 B2 | 9/2007 | Vukovic et al. |
| 7,302,276 B2 | 11/2007 | Bernhardssonn et al. |
| 7,310,526 B2 | 12/2007 | Sang et al. |
| 7,324,785 B2 | 1/2008 | Hansen et al. |
| 7,349,667 B2 | 3/2008 | Magee et al. |
| 7,359,727 B2 | 4/2008 | Tsien et al. |
| 7,359,838 B2 | 4/2008 | Marro et al. |
| 7,400,887 B2 | 7/2008 | Azman et al. |
| 7,418,241 B2 | 8/2008 | Bao et al. |
| 7,420,939 B2 | 9/2008 | Laroiaa et al. |
| 7,477,920 B2 | 1/2009 | Scheinertt et al. |
| 7,536,626 B2 | 5/2009 | Sutivong et al. |
| 7,594,151 B2 | 9/2009 | Sutivong et al. |
| 7,623,490 B2 | 11/2009 | Khandekar et al. |
| 7,639,943 B1 | 12/2009 | Kalajan |
| 7,808,895 B2 | 10/2010 | Nalawadi et al. |
| 7,962,826 B2 | 6/2011 | Sutivong et al. |
| 7,965,789 B2 | 6/2011 | Khandekar et al. |
| 8,095,166 B2 | 1/2012 | Sampath et al. |
| 8,116,800 B2 | 2/2012 | Gorokhov et al. |
| 8,150,448 B2 | 4/2012 | Farnsworth et al. |
| 8,159,928 B2 | 4/2012 | Gorokhov et al. |
| 8,442,572 B2 | 5/2013 | Borran et al. |
| 8,452,316 B2 | 5/2013 | Sutivong et al. |
| 8,516,314 B2 | 8/2013 | Sutivong et al. |
| 8,543,152 B2 | 9/2013 | Sutivong et al. |
| 2001/0040880 A1 | 11/2001 | Chen et al. |
| 2001/0053695 A1 | 12/2001 | Wallentin |
| 2001/0055968 A1 | 12/2001 | Yoshida et al. |
| 2002/0018446 A1 | 2/2002 | Huh et al. |
| 2002/0077138 A1 | 6/2002 | Bark et al. |
| 2002/0077985 A1 | 6/2002 | Kobata et al. |
| 2002/0102984 A1 | 8/2002 | Furuskar et al. |
| 2002/0141349 A1 | 10/2002 | Kim et al. |
| 2002/0145968 A1 | 10/2002 | Zhang et al. |
| 2002/0167907 A1 | 11/2002 | Sarkar et al. |
| 2002/0187801 A1 | 12/2002 | Vanghi |
| 2003/0012425 A1 | 1/2003 | Suzuki et al. |
| 2003/0013451 A1 | 1/2003 | Walton |
| 2003/0016770 A1 | 1/2003 | Trans et al. |
| 2003/0069014 A1 | 4/2003 | Raffel et al. |
| 2003/0081538 A1 | 5/2003 | Walton et al. |
| 2003/0086371 A1 | 5/2003 | Walton et al. |
| 2003/0109274 A1 | 6/2003 | Budka et al. |
| 2003/0123425 A1 | 7/2003 | Walton et al. |
| 2003/0128705 A1 | 7/2003 | Yi et al. |
| 2003/0185159 A1 | 10/2003 | Seo et al. |
| 2003/0185285 A1 | 10/2003 | Talwar |
| 2004/0038699 A1 | 2/2004 | Toono |
| 2004/0062192 A1 | 4/2004 | Liu et al. |
| 2004/0077370 A1 | 4/2004 | Dick et al. |
| 2004/0081121 A1 | 4/2004 | Xu |
| 2004/0095880 A1 | 5/2004 | Laroia et al. |
| 2004/0109432 A1 | 6/2004 | Laroia et al. |
| 2004/0151109 A1 | 8/2004 | Batra et al. |
| 2004/0166886 A1 | 8/2004 | Laroia et al. |
| 2004/0166887 A1 | 8/2004 | Laroia et al. |
| 2004/0166900 A1 | 8/2004 | Qiu et al. |
| 2004/0203455 A1 | 10/2004 | Bao et al. |
| 2004/0229615 A1 | 11/2004 | Agrawal |

(56) References Cited

U.S. PATENT DOCUMENTS

| | | |
|---|---|---|
| 2004/0229639 A1 | 11/2004 | Meyers et al. |
| 2005/0002324 A1 | 1/2005 | Sutivong et al. |
| 2005/0013283 A1 | 1/2005 | Yoon et al. |
| 2005/0026624 A1 | 2/2005 | Gandhi et al. |
| 2005/0037796 A1* | 2/2005 | Tsai et al. ............ 455/522 |
| 2005/0096061 A1 | 5/2005 | Ji et al. |
| 2005/0128970 A1 | 6/2005 | Tsien et al. |
| 2005/0135457 A1 | 6/2005 | Molisch et al. |
| 2005/0143118 A1 | 6/2005 | Bernhardsson et al. |
| 2005/0153690 A1 | 7/2005 | Marinier et al. |
| 2005/0176455 A1 | 8/2005 | Krishnan et al. |
| 2005/0192042 A1 | 9/2005 | Au et al. |
| 2005/0276248 A1 | 12/2005 | Butala et al. |
| 2005/0283715 A1 | 12/2005 | Sutivong et al. |
| 2006/0009226 A1 | 1/2006 | Vicharelli et al. |
| 2006/0019496 A1 | 1/2006 | Onishi et al. |
| 2006/0019694 A1* | 1/2006 | Sutivong et al. ............ 455/522 |
| 2006/0025158 A1 | 2/2006 | Leblanc et al. |
| 2006/0034173 A1 | 2/2006 | Teague et al. |
| 2006/0083161 A1 | 4/2006 | Laroia et al. |
| 2006/0089154 A1 | 4/2006 | Laroia et al. |
| 2006/0105796 A1 | 5/2006 | Malladi et al. |
| 2006/0135080 A1 | 6/2006 | Khandekarr et al. |
| 2006/0135169 A1 | 6/2006 | Sampath et al. |
| 2006/0164993 A1 | 7/2006 | Teague et al. |
| 2006/0165650 A1 | 7/2006 | Pavone et al. |
| 2006/0171326 A1 | 8/2006 | Durand et al. |
| 2006/0187885 A1 | 8/2006 | Roy et al. |
| 2006/0189344 A1 | 8/2006 | Umesh et al. |
| 2006/0209721 A1 | 9/2006 | Mese et al. |
| 2006/0211441 A1 | 9/2006 | Mesee et al. |
| 2006/0234752 A1 | 10/2006 | Mese et al. |
| 2006/0262868 A1 | 11/2006 | Leshem |
| 2006/0285503 A1 | 12/2006 | Mese et al. |
| 2007/0030827 A1 | 2/2007 | Rui et al. |
| 2007/0081491 A1 | 4/2007 | Kim et al. |
| 2007/0150799 A1 | 6/2007 | Sutivong et al. |
| 2007/0161385 A1 | 7/2007 | Anderson |
| 2007/0249363 A1 | 10/2007 | Amalfitano et al. |
| 2007/0258525 A1 | 11/2007 | Jacobsenn et al. |
| 2007/0270100 A1 | 11/2007 | Agrawal et al. |
| 2007/0274257 A1 | 11/2007 | Bae et al. |
| 2007/0280170 A1 | 12/2007 | Kawasakii et al. |
| 2007/0286105 A1 | 12/2007 | Kimm et al. |
| 2007/0286128 A1 | 12/2007 | Bae et al. |
| 2008/0014980 A1 | 1/2008 | Yanoo et al. |
| 2008/0031380 A1 | 2/2008 | Takabayashii et al. |
| 2008/0037439 A1 | 2/2008 | Cave et al. |
| 2008/0039129 A1* | 2/2008 | Li et al. ............ 455/522 |
| 2008/0043880 A1 | 2/2008 | Matsushitaa et al. |
| 2008/0045260 A1 | 2/2008 | Muharemovic et al. |
| 2008/0056181 A1 | 3/2008 | Imamuraa et al. |
| 2008/0062956 A1 | 3/2008 | Kuroda et al. |
| 2008/0117849 A1 | 5/2008 | Borran et al. |
| 2008/0161033 A1 | 7/2008 | Borran et al. |
| 2008/0165675 A1 | 7/2008 | Yang et al. |
| 2008/0166976 A1 | 7/2008 | Rao |
| 2008/0214121 A1 | 9/2008 | Sutivong et al. |
| 2008/0242337 A1 | 10/2008 | Sampath et al. |
| 2008/0267067 A1 | 10/2008 | Salazar et al. |
| 2008/0291856 A1 | 11/2008 | Li et al. |
| 2009/0023466 A1 | 1/2009 | Sutivong et al. |
| 2009/0082052 A1 | 3/2009 | Bhushan et al. |
| 2009/0109939 A1 | 4/2009 | Bhushan et al. |
| 2009/0117931 A1 | 5/2009 | Shin et al. |
| 2010/0027451 A1 | 2/2010 | Khandekar et al. |
| 2010/0061243 A1 | 3/2010 | Yi et al. |
| 2011/0105111 A1 | 5/2011 | Plestid et al. |
| 2011/0282999 A1 | 11/2011 | Teague et al. |
| 2011/0296279 A1 | 12/2011 | Sutivong et al. |
| 2012/0083302 A1 | 4/2012 | Borran et al. |
| 2012/0270582 A1 | 10/2012 | Mese et al. |
| 2013/0107740 A1 | 5/2013 | Mese et al. |
| 2013/0237262 A1 | 9/2013 | Borran et al. |

FOREIGN PATENT DOCUMENTS

| | | |
|---|---|---|
| CL | 199500144 | 12/1995 |
| CL | 199701119 | 3/1998 |
| CL | 199800442 | 11/1998 |
| CL | L41883 | 8/2003 |
| CL | 33582005 | 12/2006 |
| CL | 04992006 | 2/2007 |
| CL | 05752006 | 2/2007 |
| CN | 1190848 A | 8/1998 |
| CN | 1250342 A | 4/2000 |
| EP | 0668662 A1 | 8/1995 |
| EP | 0673125 A1 | 9/1995 |
| EP | 0715423 A1 | 6/1996 |
| EP | 0767548 | 4/1997 |
| EP | 0889663 A1 | 1/1999 |
| EP | 0955736 A2 | 11/1999 |
| EP | 1315310 A2 | 5/2003 |
| EP | 1320276 A2 | 6/2003 |
| EP | 1515475 A1 | 3/2005 |
| GB | 2378858 A | 2/2003 |
| JP | 2000040999 A | 2/2000 |
| JP | 2000502218 T | 2/2000 |
| JP | 2000504529 | 4/2000 |
| JP | 2001044926 | 2/2001 |
| JP | 2001274748 | 10/2001 |
| JP | 2001285193 | 10/2001 |
| JP | 2001519618 T | 10/2001 |
| JP | 2001358649 A | 12/2001 |
| JP | 2002026747 A | 1/2002 |
| JP | 2002501353 A | 1/2002 |
| JP | 2002506334 | 2/2002 |
| JP | 2002077985 A | 3/2002 |
| JP | 2003032218 A | 1/2003 |
| JP | 2003505973 | 2/2003 |
| JP | 2003510950 A | 3/2003 |
| JP | 2003318818 A | 11/2003 |
| JP | 2004502323 | 1/2004 |
| JP | 2004503126 A | 1/2004 |
| JP | 2004064142 A | 2/2004 |
| JP | 2004080340 A | 3/2004 |
| JP | 2004104293 | 4/2004 |
| JP | 2004214914 A | 7/2004 |
| JP | 2004253899 A | 9/2004 |
| JP | 2004260467 | 9/2004 |
| JP | 2004533188 | 10/2004 |
| JP | 2005501444 A | 1/2005 |
| JP | 2005502218 A | 1/2005 |
| JP | 2005505954 A | 2/2005 |
| JP | 2005065182 | 3/2005 |
| JP | 2005348433 A | 12/2005 |
| JP | 2005537691 | 12/2005 |
| JP | 2005538650 | 12/2005 |
| JP | 2007518361 A | 7/2007 |
| JP | 2008503925 | 2/2008 |
| JP | 2008526136 A | 7/2008 |
| JP | 2008533924 | 8/2008 |
| JP | 2010200474 | 9/2010 |
| KR | 100262027 B1 | 7/2000 |
| KR | 200228664 | 4/2002 |
| KR | 20030004985 A | 1/2003 |
| KR | 200324442 | 3/2003 |
| KR | 200427165 | 4/2004 |
| KR | 20040088982 A | 10/2004 |
| RU | 2001531 C1 | 10/1993 |
| RU | 2120183 C1 | 10/1998 |
| RU | 2163053 C2 | 2/2001 |
| RU | 2198465 C2 | 2/2003 |
| RU | 2214680 C2 | 10/2003 |
| RU | 2214690 C2 | 10/2003 |
| RU | 2277762 | 6/2006 |
| RU | 2005138862 | 6/2006 |
| TW | 462155 B | 11/2001 |
| TW | 508910 B | 11/2002 |
| TW | 546927 B | 8/2003 |
| TW | 584996 B | 4/2004 |
| WO | WO9427381 A1 | 11/1994 |
| WO | WO9824198 | 6/1998 |
| WO | WO9830057 | 7/1998 |

(56) References Cited

FOREIGN PATENT DOCUMENTS

| | | |
|---|---|---|
| WO | WO9918689 | 4/1999 |
| WO | WO9935865 A1 | 7/1999 |
| WO | WO9945736 A1 | 9/1999 |
| WO | WO0014900 A1 | 3/2000 |
| WO | WO0055976 A2 | 9/2000 |
| WO | WO0108325 | 2/2001 |
| WO | WO0117158 | 3/2001 |
| WO | WO0120808 A2 | 3/2001 |
| WO | 0124402 | 4/2001 |
| WO | WO0178291 A2 | 10/2001 |
| WO | WO0182504 A1 | 11/2001 |
| WO | WO0232179 A1 | 4/2002 |
| WO | WO0239609 A1 | 5/2002 |
| WO | WO0249305 | 6/2002 |
| WO | WO02091597 | 11/2002 |
| WO | WO03034645 A1 | 4/2003 |
| WO | WO03085878 A1 | 10/2003 |
| WO | WO2004025869 A2 | 3/2004 |
| WO | WO2004025986 A2 | 3/2004 |
| WO | WO2004032548 A1 | 4/2004 |
| WO | WO2004042954 A1 | 5/2004 |
| WO | WO2004059874 A1 | 7/2004 |
| WO | 2004077871 A1 | 9/2004 |
| WO | WO2004104530 | 12/2004 |
| WO | WO2004105294 A2 | 12/2004 |
| WO | WO2005034545 A1 | 4/2005 |
| WO | 2006007318 | 1/2006 |
| WO | WO2006007318 A1 | 1/2006 |
| WO | WO2006012376 A1 | 2/2006 |
| WO | WO2007014037 A2 | 2/2007 |
| WO | 2007050846 A1 | 5/2007 |
| WO | 2007112141 | 10/2007 |
| WO | WO2007146891 A2 | 12/2007 |
| WO | WO2008/030823 | 3/2008 |

OTHER PUBLICATIONS

Written Opinion—PCT/US2007/077660, International Searching Authority—European Patent Office—Jan. 2, 2008.
Hosein, Patrick, Interference management of OFDMA uplinks. IEEE 2007, pp. 2435-2439.
Damnjanovic and Vanghi, "IS-2000 Enhanced Closed Loop Power Control for Turbo Coding," IEEE 54th Vehicular Technology Proceedings, Oct. 7-11, 2001, pp. 23142318, XP-010562383.
Elmusrati, et al., "Multi-Objective Distributed Power Control Algorithm," Vehicular Technology Conference Proceedings VTC 2002 Fall IEEE 56th, vol. 2, pp. 812-816.
Nevdyaev, L.M., "Telecommunication Technologies," Moscow, Business and Communications, 2002, p. 140.
TIA/EIA/IS-95 "Mobile Station-Base Station Compatibility Standard for Dual-Mode Wideband Spread Spectrum Cellular System" Jul. 1993.
Tomcik, T.: "QTDD Performance Report 2", IEEE C802.20-05/88, IEEE 802.20 Working Group on Mobile Broadband Wireless Access, http://ieee802.org/20/, pp. 1-56, XP002386798 (Nov. 15, 2005).
Group on Mobile Broadband Wireless Acess, http://ieee802.org/20/, pp. 1-56, XP002386798 (Nov. 15, 2005).
Tanaka et al., Fast initial acquisition of transmitter power for the reverse link DS/CDMA cellular systems, May 1998, IEEE Vehicular Technology Conference, p. 2436-2440.
Bowie, Song, et al., "Iterative Joint Channel Estimation and Signal Detection in MIMO OFDM Systems," Institute of Image Communication and Information Processing, Shanghai Jiao Tong University Shanghai, China, 2005, pp. 39-43.
Roberto Padovani, "The Application of Spread Spectrum to PCS has Become A Reality Reverse Link Performance of IS-95 Based Cellular Systems," IEEE Personal Communication, US, IEEE Communications Society. vol. 1, No. 3, Jul. 1, 1994, pp. 28-34.
Shao, L. et al.; "Downlink multicell MIMO-OFDM: An architecture for next generation wireless networks," in Proc. IEEE Wireless Commun. and Networking Conf. (WCNC), vol. 2, Santa Clara, USA, Mar. 2005, pp. 1120-1125.
U.S. Appl. No. 60/516,557, "Layered Frequency Hopping for OFDMA", filed on Oct. 30, 2003 by Ji, et al., 6 pages.
European Search Report—EP08008762—Search Authority—Munich—Jun. 22, 2011.
Taiwan Search Report—TW096133592—TIPO—Feb. 25, 2012.
European Search Report—EP12161453—Search Authority—The Hague—Apr. 24, 2012.
Qualcomm Incorporated: QFDD Technology Overview Presentation, IEEE 802.20 Working Group on Mobile Broadband Wireless Access, C802.20-05-59, Nov. 2005, XP002518168, Retrieved from Internet: URL:http://grouper.ieee.org/groups/802/20/Contributions.html, pp. 45-47, Oct. 28, 2005.
Tomcik, Jim: "QFDD and QTDD: Technology Overview", IEEE 802.20 Working Group on Mobile Broadband Wireless Access, XP002480491, Oct. 28, 2005, pp. 1, 61-106, Retrieved from Internet: URL: http://grouper.iee.org/groups/802/20/Contributions.html.
C30-20060327-023, "QUALCOMM Proposal for 3GPP2 Air Interface Evolution Phase 2", Dallas, TX, Mar. 2006.
China Unicom et al., "Joint Proposal for 3GPP2 Physical Layer for FDD Spectra", C30-20060731-040R4_HKLLMNQRSUZ_PP2Phase2_FDD_Proposal -1,3GPP2, Jul. 31, 2006.
Qualcomm Incorporated: "Qualcomm Proposal for 3GPP2 Physical Layer", C30-20060522-035 QC_Proposal_v1.0, 3GPP2, May 22, 2006.
Qualcomm Incorporated: "Qualcomm Proposal for 3GPP2 Physical Layer for FDD Spectra", C30-20060626-028_QCOM_UHDR-One_FDD Proposal_v1.0, 3GPP2, Jun. 26, 2006.

\* cited by examiner

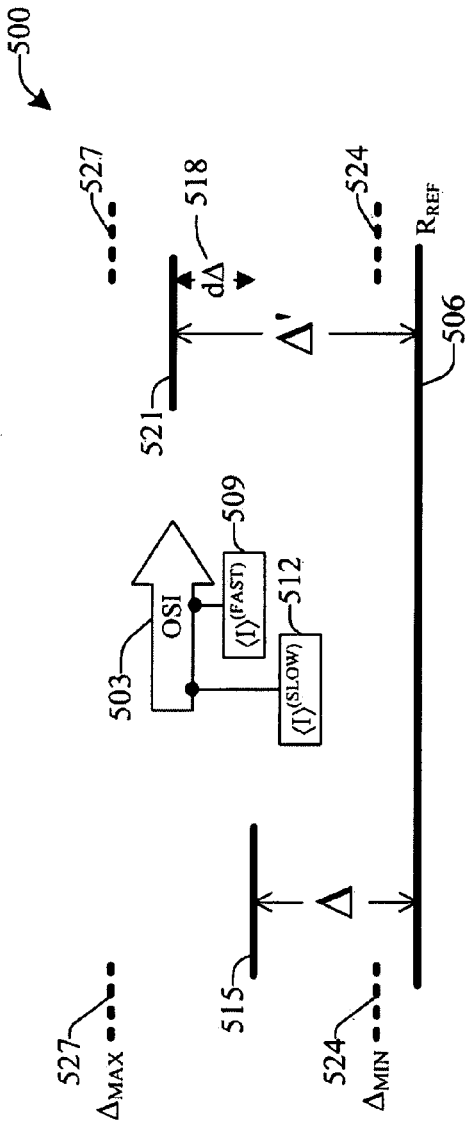
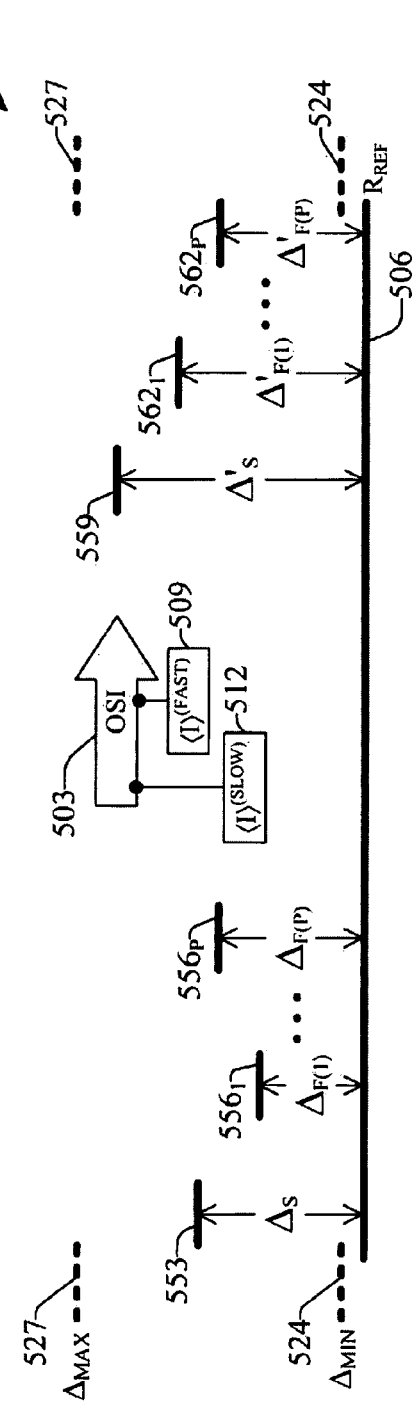
FIG. 5A
FIG. 5B

METHOD AND APPARATUS FOR FAST OTHER SECTOR INTERFERENCE (OSI) ADJUSTMENT

CROSS-REFERENCE TO RELATED APPLICATION

This application claims the benefit of U.S. provisional application Ser. No. 60/843,291, filed on Sep. 8, 2006, and entitled "A METHOD AND APPARATUS FOR FAST OTHER SECTOR INTERFERENCE (OSI) ADJUSTMENT." The entirety of this application is incorporated herein by reference.

BACKGROUND

I. Field

The present disclosure relates generally to wireless communications, and more specifically to techniques for fast other sector interference and communication resource adjustment in a wireless communication system.

II. Background

Wireless communication has penetrated nearly every aspect of a person's daily routine. To facilitate work/office activities as well as entertainment, wireless systems are widely deployed to provide various types of communication content such as voice, data, video, and so on. These systems can be multiple-access systems that are capable of supporting communication for multiple terminals by sharing available system resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems.

A wireless multiple-access communication system can simultaneously support communication for multiple wireless terminals. In such a system, each terminal can communicate with one or more sectors via transmissions on the forward and reverse links. The forward link (or downlink) refers to the communication link from the sectors to the terminals, and the reverse link (or uplink) refers to the communication link from the terminals to the sectors. These communication links can be established via a single-input-single-output (SISO), multiple-input-single-output (MISO), and/or multiple-input-multiple-output (MIMO) systems.

Multiple terminals can simultaneously transmit on the reverse link by multiplexing their transmissions to be orthogonal to one another in the time, frequency, and/or code domain. If full orthogonality between transmissions is achieved, transmissions from each terminal will not interfere with transmissions from other terminals at a receiving sector. However, complete orthogonality among transmissions from different terminals is often not realized due to channel conditions, receiver imperfections, and other factors. As a result, terminals often cause some amount of interference to other terminals communicating with the same sector. Furthermore, because transmissions from terminals communicating with different sectors are typically not orthogonal to one another, each terminal can also cause interference to terminals communicating with nearby sectors. This interference results in a decrease in performance at each terminal in the system. Accordingly, there is a need in the art for effective techniques to mitigate the effects of interference in a wireless communication system.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In an aspect, a method for resource management in a wireless system is disclosed, the method comprising: receiving an indication of other-sector interference (OSI); determining whether a delta value associated with a communication resource should be adjusted in response to the received OSI indication; the determination includes identifying the time-frequency resources corresponding to the OSI indication; and adjusting the delta value associated with the communication resource.

In another aspect, the subject specification discloses a wireless communication apparatus, comprising: an integrated circuit configured to acquire a set of access points, to receive an indication of excessive other-sector interference (OSI) from an access point in a set of acquired access points, to adjust an offset value associated with a communication resource according to the excessive OSI indication, and to retain the adjusted offset value; and a memory coupled to the integrated circuit for storing data.

In yet another aspect, an apparatus that facilitates managing resources in a wireless communication system, the apparatus comprising: means for establishing a set of non-serving access points (APs) to monitor for other-sector interference indications; means for receiving an other-sector interference (OSI) indication from one or more APs in the monitor set; and means for adjusting an offset value associated with a communication resource according to the received OSI indication.

In still another aspect, a computer-readable mediums comprising: code for causing a computer to receive an indication of excessive other-sector interference from a set of non-serving access points; code for causing a computer to adjust an offset value associated with a communication resource assigned by an access point; and code for causing a computer to communicate the adjusted offset value to an access point to update subsequent resource assignments.

In an aspect, a method for managing interference in a wireless system, comprising: determining an interference level based on an interference metric; generating an indication of other-sector interference (OSI) based on the determined interference level; and transmitting the OSI indication.

In another aspect, an apparatus used in wireless communications, comprising: means for determining a fast interference level based on an interference metric; means for generating an indication of fast other-sector interference (OSI) according to the fast interference level; and means for transmitting the generated OSI indication.

In yet another aspect, a computer-readable medium comprising: code for causing a computer to measure interference levels on a frame time scale and a superframe time scale, the time scales dictated by a symbol numerology of a wireless system; code for causing a computer to compute an effective interference level based on the interference level measurements; and code for causing a computer to issue an excess other-sector interference indication according to the computed effective interference level.

In still another aspect, an electronic appliance that operates in a wireless communication environment, the appliance comprising: an integrated circuit configured to facilitate measurements of an interference level in frequency-domain and time-domain, the measurements conducted at disparate time scales, to compute effective interference levels employing results of the measurements in slow and fast time regimes, and to broadcast an indication of excessive other-sector interference; and a memory coupled to the integrated circuit to store measured and computed data.

In further yet another aspect, an apparatus that facilitates wireless communications, the system comprising: an integrated circuit configured to transmit a resource assignment, and to receive an adjusted offset value associated with an assigned resource; and a memory coupled to the integrated circuit for storing data, the data includes the adjusted value of an offset associated with a communication resource.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIGS. 5A and 5B are example diagrams that represent offset values and their response to an indication of excessive other-sector interference in accordance with an aspect of the subject specification.

DETAILED DESCRIPTION

Figure 1:
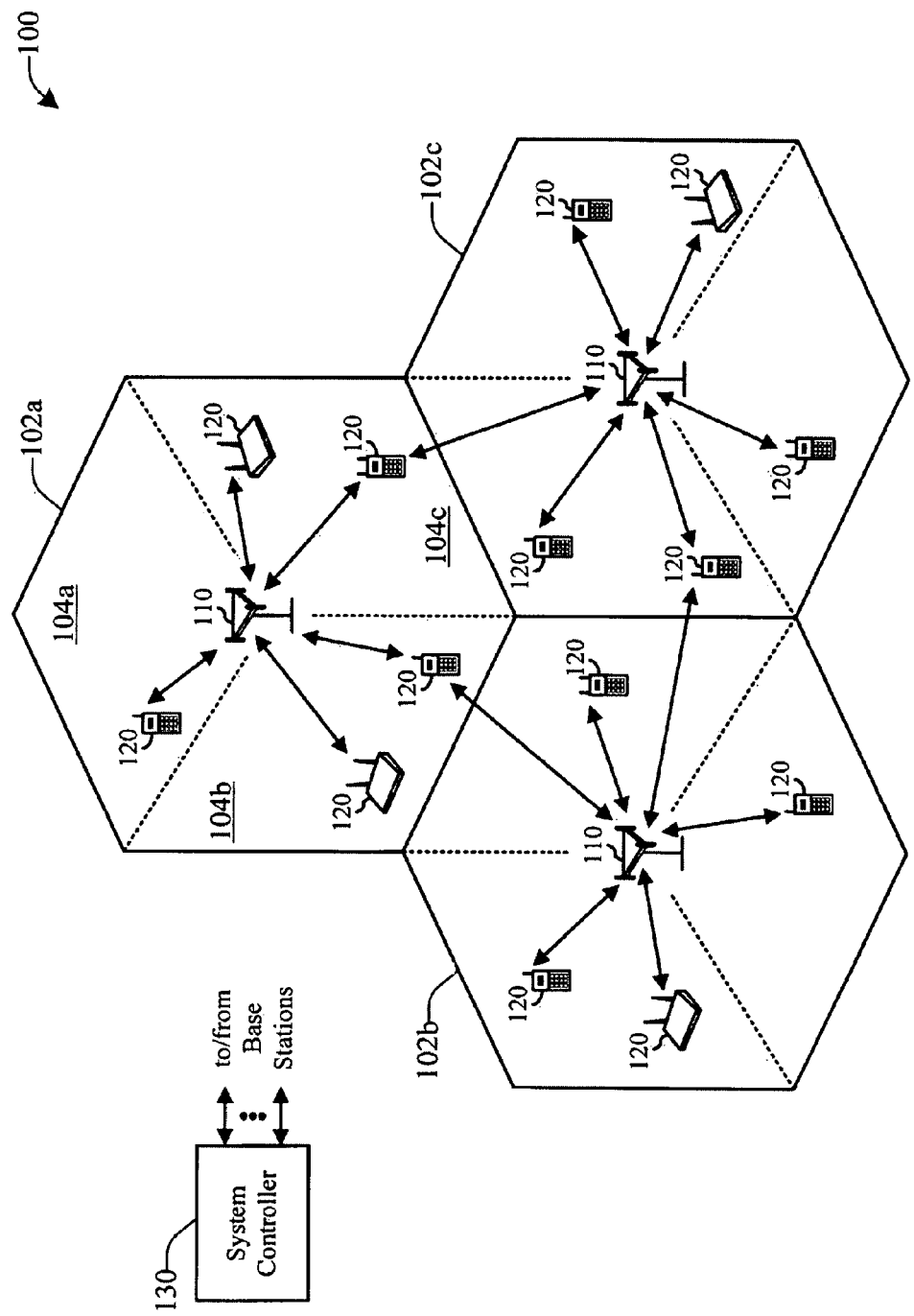
FIG. 1 illustrates a wireless multiple-access communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident; however, that such embodiment(s) may be practiced without these specific details. In other instances, well-known structures and devices are shown in block diagram form in order to facilitate describing one or more embodiments.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, evolved Node B (eNodeB), or some other terminology.

Referring now to the drawings, FIG. 1 is an illustration of a wireless multiple-access communication system 100 in accordance with various aspects. In one example, the wireless multiple-access communication system 100 includes multiple base stations 110 and multiple terminals 120. Further, one or more base stations 110 can communicate with one or more terminals 120. By way of non-limiting example, a base station 110 can be an access point, a Node B, and/or another appropriate network entity. Each base station 110 provides communication coverage for a particular geographic area 102a-c. As used herein and generally in the art, the term "cell" can refer to a base station 110 and/or its coverage area 102a-c depending on the context in which the term is used.

To improve system capacity, the coverage area 102a, 102b, or 102c corresponding to a base station 110 can be partitioned into multiple smaller areas (e.g., areas 104a, 104b, and 104c). Each of the smaller areas 104a, 104b, and 104c can be served by a respective base transceiver subsystem (BTS, not shown). As used herein and generally in the art, the term "sector" can refer to a BTS and/or its coverage area depending on the context in which the term is used. In one example, sectors 104a, 104b, and 104c in a cell 102a, 102b, or 102c can be formed by groups of antennas (not shown) at base station 110, where each group of antennas is responsible for communication with terminals 120 in a portion of the cell 102a, 102b, or 102c. For example, a base station 110 serving cell 102a can have a first antenna group corresponding to sector 104a, a second antenna group corresponding to sector 104b, and a third antenna group corresponding to sector 104c. However, it should be appreciated that the various aspects disclosed herein can be used in a system having sectorized and/or unsectorized cells. Further, it should be appreciated that all suitable wireless communication networks having any number of sectorized and/or unsectorized cells are intended to fall within the scope of the hereto appended claims. For simplicity, the term "base station" as used herein can refer both to a station that serves a sector as well as a station that serves a cell. As further used herein, a "serving" access point is one with which a terminal has RL traffic (data) transmissions, and a "neighbor" (non-serving) access point is one with which a terminal can have FL traffic and/or both FL and RL control transmissions but no RL traffic. It should be appreciated that as used herein, a FL sector in a disjoint link scenario is a neighbor sector. While the following description generally relates to a system in which each terminal communicates with one serving access point for simplicity, it should be appreciated that terminals can communicate with any number of serving access points.

In accordance with one aspect, terminals 120 can be dispersed throughout the system 100. Each terminal 120 can be stationary or mobile. By way of non-limiting example, a terminal 120 can be an access terminal (AT), a mobile station, user equipment, a subscriber station, and/or another appropriate network entity. A terminal 120 can be a wireless device, a cellular phone, a personal digital assistant (PDA), a wireless modem, a handheld device, or another appropriate device. Further, a terminal 120 can communicate with any number of base stations 110 or no base stations 110 at any given moment.

In another example, the system 100 can utilize a centralized architecture by employing a system controller 130 that can be coupled to one or more base stations 110 and provide coordination and control for the base stations 110. In accordance with alternative aspects, system controller 130 can be a single network entity or a collection of network entities. Additionally, the system 100 can utilize a distributed architecture to allow the base stations 110 to communicate with each other as needed. In one example, system controller 130 can additionally contain one or more connections to multiple networks. These networks can include the Internet, other packet based networks, and/or circuit switched voice networks that can provide information to and/or from terminals 120 in communication with one or more base stations 110 in system 100. In another example, system controller 130 can include or be coupled with a scheduler (not shown) that can schedule transmissions to and/or from terminals 120. Alternatively, the scheduler can reside in each individual cell 102a-c, each sector 104a-c, or a combination thereof In an example, system 100 can utilize one or more multiple-access schemes, such as CDMA, TDMA, FDMA, OFDMA, Single-Carrier FDMA (SC-FDMA), and/or other suitable multiple-access schemes. TDMA utilizes time division multiplexing (TDM), wherein transmissions for different terminals 120 are orthogonalized by transmitting in different time intervals. FDMA utilizes frequency division multiplexing (FDM), wherein transmissions for different terminals 120 are orthogonalized by transmitting in different frequency subcarriers. In one example, TDMA and FDMA systems can also use code division multiplexing (CDM), wherein transmissions for multiple terminals can be orthogonalized using different orthogonal codes (e.g., Walsh codes) even though they are sent in the same time interval or frequency sub-carrier. OFDMA utilizes Orthogonal Frequency Division Multiplexing (OFDM), and SC-FDMA utilizes Single-Carrier Frequency Division Multiplexing (SC-FDM). OFDM and SC-FDM can partition the system bandwidth into multiple orthogonal subcarriers (e.g., tones, bins, . . . ), each of which can be modulated with data. Typically, modulation symbols are sent in the frequency domain with OFDM and in the time domain with SC-FDM. Additionally and/or alternatively, the system bandwidth can be divided into one or more frequency carriers, each of which can contain one or more subcarriers. System 100 can also utilize a combination of multiple-access schemes, such as OFDMA and CDMA. While the power control techniques provided herein are generally described for an OFDMA system, it should be appreciated that the techniques described herein can similarly be applied to any wireless communication system.

In another example, base stations 110 and terminals 120 in system 100 can communicate data using one or more data channels and signaling using one or more control channels. Data channels utilized by system 100 can be assigned to active terminals 120 such that each data channel is used by only one terminal at any given time. Alternatively, data channels can be assigned to multiple terminals 120, which can be superimposed or orthogonally scheduled on a data channel. To conserve system resources, control channels utilized by system 100 can also be shared among multiple terminals 120 using, for example, code division multiplexing. In one example, data channels orthogonally multiplexed only in frequency and time (e.g., data channels not multiplexed using CDM) can be less susceptible to loss in orthogonality due to channel conditions and receiver imperfections than corresponding control channels.

In accordance with an aspect, system 100 can employ centralized scheduling via one or more schedulers implemented at, for example, system controller 130 and/or each base station 110. In a system utilizing centralized scheduling, scheduler(s) can rely on feedback from terminals 120 to make appropriate scheduling decisions. In one example, this feedback can include delta offset added to the OSI information for feedback in order to allow the scheduler to estimate a supportable reverse link peak rate for a terminal 120 from which such feedback is received and to allocate system bandwidth accordingly.

In accordance with another aspect, in system 100, reverse link interference and resources control can result in a guaranteed minimum system stability and quality of service (QoS) parameters for the system. As an example, decoding error probability of reverse link (RL) acknowledgement messages can result in an error floor for all forward link transmissions. By employing tight interference control on the RL, system 100 can facilitate power efficient transmission of control and QoS traffic and/or other traffic with stringent error requirements.

Figure 2:
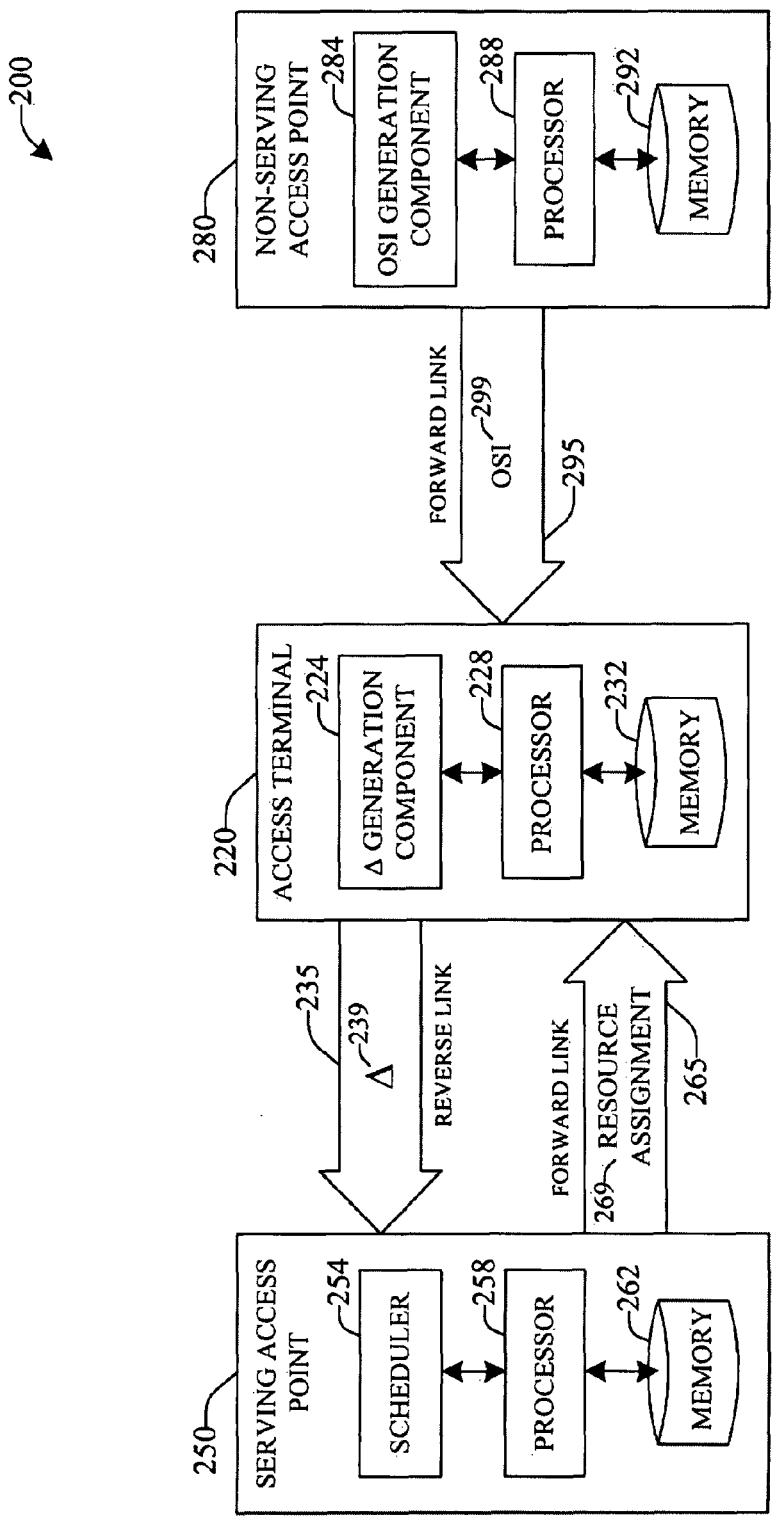
FIG. 2 illustrates a block diagram of an example system that facilitates interference and communication resource management.

FIG. 2 shows a block diagram of an example system 200 that facilitates interference and communication resource management. An access terminal (AT) 220 communicates with a serving access point (AP) 250, which can transmit data and control code symbols to AT 220 over forward link (FL) 265 and can receive data and control through reverse link (RL) 235. Serving AP 250 can send a resource assignment to terminal 220. Such resource assignment conveys information on communication resources such as power level and/or power spectral density, packet format, modulation, etc., that AT 220 can employ to conduct a communication with AP 250. Resource assignments can be managed by scheduler 254 which can determine assignments based on feedback information received from AT 220 over RL 235. It is noted that scheduler 254 can be coupled, e.g. to a processor 258 and a memory 262. Processor 258 can facilitate part or all functionality of scheduler 254, and memory 262 can retain, for example, a record of scheduling assignments. In an aspect, scheduler 254 can receive an offset (Δ 239) value over RL 235 in connection with a communication resource in order to adjust the resource level and re-assign resources according to Δ 239. Such re-assignment can be employed to mitigate interference caused by AT 220 on other-sector, non-serving APs such as AP 280. Interference can be mitigated when AP 250 re-assigns a lower operational power to AT 220 in response to receiving a Δ 239 value. It is noted that hereinafter the "Δ," "offset," and "delta" are employed interchangeably and their meaning is intended to be substantially the same. Determination/adjustment of Δ is discussed below.

Access terminal 220 can receive information from non-service access point 280 over forward link 295. While a single non-serving AP is illustrated in example system 200, it is noted that AT 220 can receive information from a plurality of non-serving APs. Such access points can be acquired at the time serving AP 250 is acquired, and can form an active set for AT 220. (The active set can be stored, for example, in memory 232.) Moreover, AT 220 can refine such active set after acquisition, according to predetermined thresholds in connection with received power of pilots and interference over thermal noise (IoT). Information transmitted/broadcasted by non-serving AP 280 (or another non-serving AP in the refined active set) can be monitored. In particular, AT 220 can monitor an indication of other-sector interference (OSI). It is noted that APs outside an active set can also be monitored (see below). The decision at the mobile as to whether or not monitor OSI indications from a given sector can be based on the sector's FL geometry (e.g., filtered signal-to-interference-and-noise ratio (SINR) of acquisition pilots) in conjunction with predefined thresholds.

Indication of excessive OSI 299 can be transmitted or broadcasted over physical channels of forward link 295. In an aspect, in third generation ultra mobile broadband (3 G UMB) systems, the forward OSI channel (F-OSICH) carries the OSI indications. Despite system specifications, it should be appreciated that a requirement for such channels can be large coverage area, as the channel needs to be decoded at access terminals that are not being served by the transmitting sector (e.g., sectors 104a-c). Particularly, a channel carrying an OSI indication can have the same coverage as the acquisition pilot channels (e.g., forward common pilot channel (F-CPICH), forward channel quality indicator pilot channel (F-CQIPICH) in 3 G UMB) which penetrate far into the neighboring sectors (e.g., second and third nearest neighbors). Moreover, a physical channel carrying an OSI 299 indication needs to be decodable without requiring additional information regarding its transmitting sector other than the pilot pseudonoise code sequence. Such requirements (i) make a physical control channel carrying OSI indications (such as F-OSICH in 3 G UMB) significantly costly in terms of required power and time-frequency resources, as well as (ii) limit the rate at which OSI indications can be transmitted over the channel—typically once every superframe (see below). The large coverage of a channel like F-OSICH, in 3 G UMB, can result in OSI indications transmitted by sectors outside an acquired active set being monitored, e.g. decoded by an access terminal.

Non-serving access point 280 can include an OSI generation component 284, which can be coupled to a processor 288 and memory 292. Component 284 can generate an OSI 299 indication over long or short periods of time with respect to a transmission time interval (e.g. a frame, a sub-frame). Such indications are described next. (i) Slow OSI. Long periods of time can correspond to one or more superframes or radio frames. In an aspect, in 3 G UMB, a superframe encompasses 25 frames and, depending on time guards and cyclic prefixes, it can span nearly 24-28 ms. In another aspect, a radio frame in a third generation long-term evolution (3 G LTE) system spans 10 ms. An OSI 299 indication generated by component 284 in such time intervals, or longer, is termed herein "slow" OSI or regular OSI. It is noted that slow OSI can correspond to an average indication over the probed time interval (e.g., a superframe) and it can be effective in reflecting the interference observed by a non-serving AP (e.g., 250) when variations of channel interference are slow. Moreover, slow OSI can be effective in sectors that present a fix pattern of transmission, e.g. bandwidth (BW) assignments as well as buffer status do not change appreciably over the course of a transmission involving several superframes. Slow OSI can also accurately represent interference levels in a sector if there is enough statistical multiplexing in the system, e.g. terminals increasing BW compensate those wireless devices whose BW decrease, or the network is fully loaded.

(ii) Fast OSI. In some scenarios, such as those communication systems which are not fully loaded and bursty users are present, OSI 299 indications over a short period of time can be necessary. In an aspect, such a scenario can be realized where a single access terminal, located near the boundary of two sectors, suddenly initiates a new transmission after a substantially long period of silence, and causes a significant amount of interference to reverse link transmissions currently taking place in a neighboring sector. It should be appreciated that employing a physical forward link channel carrying slow OSI 299 indications, e.g. F-OSICH in 3 G UMB, it may take several superframe time intervals for a neighboring sector to force such a terminal to lower its transmit power in order to reduce interference to an acceptable level. During such extended interval the reverse link transmissions in that sector can suffer from severe interference, and may experience a large number of packet errors. OSI 299 indications that arise from measurement of interference per frame or sub-frame, are termed herein "fast" OSI.

Figure 4:
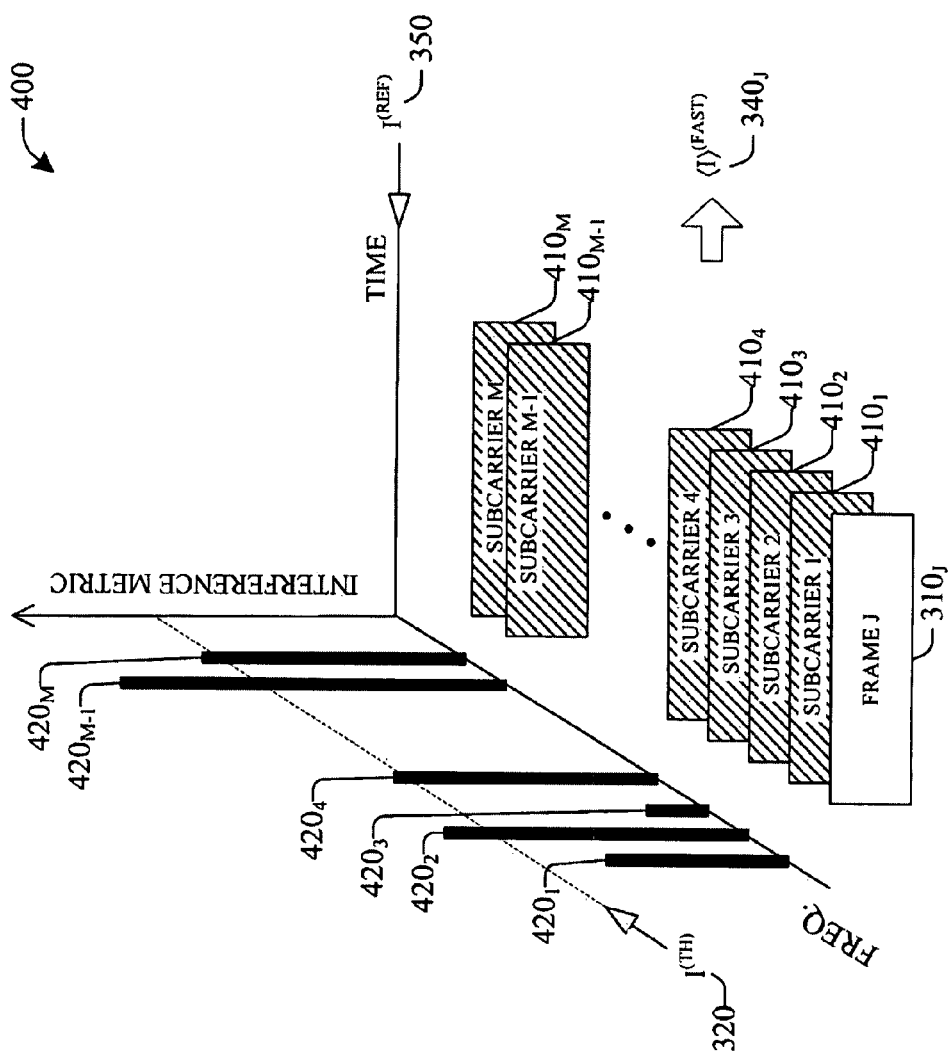
FIG. 4 is example diagram of interference metric values in frequency domain.

It should be appreciated that OSI generation component 284 can generate both slow and fast OSI indications per subcarrier or per subband, e.g., a set of subcarriers (FIG. 4). In such a scenario, fast OSI can become sufficiently granular (in time-frequency resources) so as to being able to distinguish whether a terminal A or B is causing the observed interference.

The effects of a bursty terminal (e.g., access terminal 220) can be addressed/mitigated by exploiting the fact that long term channel qualities on forward and reverse links can often be highly correlated: A terminal causing strong interference at a non-serving sector on the reverse link, can most likely observe a strong signal (e.g. pilot signal) from the non-serving sector on the forward link (e.g., forward link 295), and can have that sector in its active set. Thus, each access point on non-serving sectors (e.g., access point 280) can transmit fast OSI indications, in addition to transmitting slow OSI indications, to an access terminal via a forward link control channel with lower overhead than that of the slow OSI indication channel. To the accomplishment of such transmission, the access terminal needs to have the transmitting access points in its active set. In an aspect, such channel can be embodied in a forward link fast OSI channel (F-FOSICH) that can transmit in 3 G UMB systems. It should be appreciated that since a fast OSI indication can be intended for a substantially restricted group of access terminals, e.g., those which have the transmitting AP in their active set, the coverage requirements for conveying such information need not be as large as the requirements for a channel carrying a slow OSI indication. In another aspect, the F-FOSICH mentioned supra can be present in every FL physical layer frame (hence revealing the root of its name), allowing for a non-serving access point (e.g., 280) to rapidly address/mitigate the interference from a bursty access terminal (e.g., 220) in a neighboring sector before such a terminal causes packet errors in the sector serviced by the access point.

Next, the functionality of OSI generation component 284 is described in greater detail. To illustrate aspects of the functionality, the description makes reference to FIG. 3 and FIG. 4 which are, respectively, an example diagram 300 of an interference metric for a sample superframe consisting of K illustrative RL physical frames $310_1$-$310_K$, and an example diagram 400 of an interference metric in frequency-domain. It is noted that such frames span a specific amount of time dictated by the specifications of the wireless system in which APs 250 and 280, as well as AT 220, operate. In an aspect, symbol numerology determines the time span. As an example, in 3 G UMB, frames can span nearly 1 ms, including the various numbers of cyclic prefixes in a frame, and a superframe contains K=25 frames (and a preamble). To generate OSI indications, a non-serving access point (e.g. non-serving AP 280) can use a metric based on the amount of interference it observes on different time-frequency resources (e.g., frames $310_1$-$310_K$), and utilize a function of such measured interference. Moreover, a threshold (or tolerance) interference metric value $I_{TH}$ 320 is employed as reference in order to issue an indication of excess interference. It should be appreciated that several factors can determine $I_{TH}$, and these factors can typically be determined by a service provider: target peak data rate, target spectral efficiency, target latency, complexity and cost of base station/access point, etc. Similarly, interference can be measured in dB with respect to a reference value $I^{(RFF)}$ 350 that can be determined by, e.g. thermal noise in the system, and other sources of systematic noise.

Figure 3:
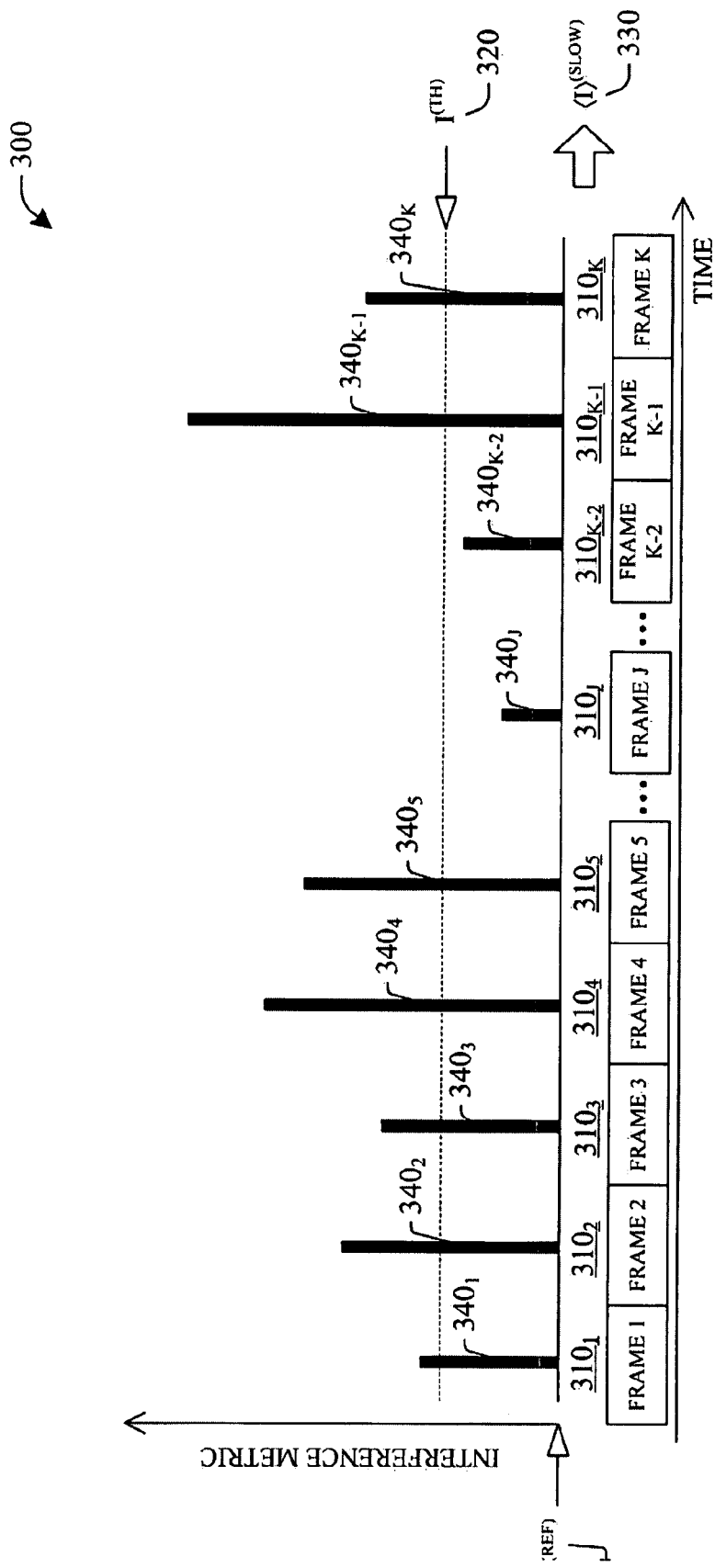
FIG. 3 is example diagram of interference metric values in a time domain spanning an illustrative superframe.

In an aspect, procedures/methods to determine an interference level can be devised, which can include the following four. (1) A typical metric can be the average interference for both slow OSI and fast OSI. An average over all frequency resources (e.g., subcarriers $410_1$-$410_M$, FIG. 4) and over a number of (recent) reverse link frames (e.g., $310_J$-$310_K$, with J<K) leads to $\langle I \rangle^{(SLOW)}$ 330. Alternatively, an average value can be extracted by passing all frequency, per-frame averages in a recent superframe through an infinite impulse response (IIR) filter of a given constant (e.g., 25 ms, the time span of a supergrame in 3 G UMB). In FIG. 3, the interference frequency averages $340_1$-$340_K$ are indicated for each frame $310_1$-$310_K$. If average interference $\langle I \rangle^{(SLOW)}$ 330 is above threshold $I_{TH}$ 320, then an indication of excessive OSI is issued by OSI generation component 284. As discussed above, computing an average can capture slowly varying changes in a wireless communication sector. In an aspect, in a 3G UMB system, a non-serving access point (e.g., 280) can use the regular OSI channel (F-OSICH) to control the mean interference by generating the OSI indications based on a long-term average (filtered version) of the measured average interference over all frequency resources. Regarding fast OSI, averaging over frequency resources such as subcarriers (e.g., all or a subset of subcarriers $410_1$-$410_M$), or subbands, can result in fast average interference values $340_1$-$340_K$. As illustrated in FIG. 4, fast OSI can be determined for each subcarrier in frequency domain: values $420_1$-$420_M$ correspond to observed interference metric values in a specific frame (FIG. 4 presents frame $310_J$). It is noted that for each frame, e.g., frame $310_J$, interference values $420_1$-$420_M$ can be assigned to a fast OSI, in addition to the average over frequency resources, e.g., $\langle I \rangle^{(FAST)}$ $340_J$.

A processor (e.g., processor 288) can compute the averages, as well as other computations relevant to procedure (1), and results can be stored in a memory (e.g., memory 292). Moreover, a processor (e.g., processor 288) can facilitate conducting measurement of interference levels in the time-frequency domain; data can be stored in a memory (e.g., memory 292).

(2) A method consisting of monitoring high percentiles (e.g., tails) of cumulative distribution functions (CDF) of interference measurement distributions (e.g., values $340_1$-$340_K$ represent a distribution over frames $310_1$-$310_K$) can be employed by OSI generation component 284 for both slow OSI and fast OSI. An interference level extracted with such a method, as described below, is termed herein tail interference. Monitoring tail values can be well suited to guarantee minimum performace and/or preserve communications over control channels, which typically avoid repeated requests from a receiver (e.g., hybrid automated repeat request (HARQ)), and thus can be more susceptible to packet corruption, and information loss, if a sharp rise in the level of interference in the sector takes place during transmission. Regarding slow OSI, OSI generation component 284 can generate a distribution of per-frame averages for recent frames in a superframe, e.g., $340_J$-$340_K$ and a corresponding CDF, and then extract a tail interference value $I_{TAIL(S)}$ that corresponds to a specific per-centile, e.g., 90%; issuing an OSI indication in case $I_{TAIL(S)}$ is above $I_{TH}$ 320. For fast OSI, OSI generation component 284 can issue an OSI indication when a value $I_{TAIL(F)}$ is above a threshold, e.g. $I^{(TH)}$ 320, where $I_{TAIL(F)}$ corresponds to a specific interference value associated with a high percentile of the CDF of a distribution of interference levels for a set of frequency resources (for example, values $420_1$-$420_M$). A processor (e.g., processor 288) can compute the averages, as well as other computations relevant to the procedure, and results can be stored in a memory (e.g. memory 292). Moreover, a processor (e.g., processor 288) can facilitate conducting measurement of interference levels in the time-frequency domain; measured data can be stored in a memory (e.g. memory 292).

(3) Alternatively, or in addition, OSI generation component 284 can employ a hybrid-approach based on (1) and (2): An average interference metric with a threshold $\langle I \rangle_{TH}$, and a tail interference metric with a threshold $I^{(TAIL)}_{TH}$ are concurrently implemented for either slow OSI or fast OSI. An excessive OSI indication corresponding to either slow or fast OSI is issued by OSI generation component 284 when average and tail interference levels surpass, respectively, $\langle I \rangle_{TH}$ and $I^{(TAIL)}_{TH}$. It should be appreciated that these thresholds are established for slow OSI or fast OSI, depending on the OSI indication that OSI component generation 284 is generating. A processor (e.g., processor 288) can compute the averages, as well as other computations relevant to the procedure. Data and results can be stored in a memory (e.g., memory 292). Moreover, a processor (e.g., processor 288) can facilitate conducting measurement of interference levels in the time-frequency domain; data can be stored in a memory (e.g. memory 292).

(4) OSI generation component 284 can determine an effective interference metric and contrast it with $I_{TH}$ in order to generate an indication of excess OSI. Employing an effective metric can take advantage of the system diversity, e.g., if a metric adopts a large value for a specific resource (e.g., a set of subcarriers) and another instance of the same metric at a different resource (e.g., another set of carriers) adopts a small value, computing an effective interference metric incorporates such diversity. It is noted that while effective metrics such as average metrics can smooth out such diversity fluctuations, other effective metrics can enhance extreme values in the diversity profile. Another effective metric, is the one based on the notion of system capacity. In such a case, diverse values of an interference metric, computed over a set of time-frequency resources, can be transformed to capacity values. The computed capacity values can be averaged, and an effective interference metric extracted from the average. Functions of an interference level other that a capacity function can be employed when computing the effective metric. An example of such another function is the signal-to-interference ratio.

Similar to (1) and (2), a determination of an effective interference metric relies on measured values of interference levels on a set of time-frequency resources (e.g., frames $310_1$-$310_K$, subcarriers $410_1$-$410_M$. It should be appreciated that the measured values can correspond to measurements on each time-frequency resource (e.g., a single frame, a single carrier), or to measurements that probe an average condition of a subset of time-frequency resources, such as a tile (e.g., 16 subcarriers in a frame time-span). Generation of an effective metric then employs a function ($f$) of an interference level (I). As mentioned supra, such a function can be a capacity or a signal-to-interference ratio. Function $f$ is evaluated for each interference level in a plurality of measured interference levels, and the average (A) of the results is generated. It is noted that when considering an average as an effective metric (see above) the function $f$ is the identity, e.g., $f(I)=I$. The effective interference metric is extracted by evaluating the inverse function of $f(I)$ with A as an argument value, e.g., $f^{-1}(A)$. It should be appreciated that if all measured values are identical, e.g., $I_{NF}$ corresponding to a scenario where there are no fluctuations in the interference level when probing disparate time-frequency resources, the effective interference metric correspond to said $I_{NF}$.

A processor (e.g., processor 288) can compute the averages, as well as other computations relevant to the procedure such as computing capacities and deriving effective values. Data and results can be stored in a memory (e.g. memory 292). Moreover, a processor (e.g., processor 288) can facilitate conducting measurement of interference levels in the time-frequency domain; data can be stored in a memory (e.g. memory 292).

The subject effective metric approach can be illustrated adopting signal-to-noise (SNR) ratio as the interference metric. For instance, if multiple resources are available for communication (e.g. subcarriers, modulation and coding schemes, transmit and receive antennas at access point and access node, . . . ), OSI generation component 284 can compute multiple values of SNR. Thus, multiple options are available to define an effective SNR and generate an effective interference metric: (a) average SNR, (b) ratio of average signal (⟨ S ⟩) over average interference/noise ⟨ I ⟩), and (c) an effective SNR computed with some notion of capacity (e.g., Shannon's capacity, for single-input-single-output (SISO) systems, or Telatar-Foschini capacity in multiple-input-multiple-output systems (MIMO)). The programmatic implementation of (c) consists of taking each SNR computed value, converting each value to a capacity measure, averaging the computed capacities, and generating an effective SNR through the inverse capacity function. OSI generation component 284 can perform the latter acts. Option (c) takes advantage of the diversity by capturing in the average those values of SNR that are sensitive to a communication resource, and those SNR values that are independent of or insensitive to said resource. Alternatively, if an access point (e.g., AP 280) can measure interference (I) values without access to corresponding signal values (S) values, a nominal $S_{NOM}$ value can be established (e.g., received over a reverse link or read from storage such as memory 292) and by measuring interference on different resources, SNR values can be defined and effective SNR values can be computed. Conversely, if S values can be accessed without access to I values, a nominal $I_{NOM}$ value can be determined (e.g., received over a reverse link or read from storage such as memory 292) and effective SNR values generated by measuring S, defining SNR values employing the nominal I value, and transforming to capacity. OSI generation component 284 can perform the latter acts related to effective SNR generation.

It should be appreciated that substantially any metric can be employed to compute an effective threshold. Interference metrics can be associated with other performance metrics such as signal-to-interference ratio, signal-to-interference-and-noise ratio. Such performance metrics can also lead to a value of interference that can be utilized by OSI generation component 284 to determine whether issuing an excessive OSI is warranted. It should also be appreciated that each of approaches/procedures (1)-(4) can be more suitable for specific concepts. Approach (1), which relies in determination of average interference metrics can be suitable for systems in which an access terminal (e.g., access terminal 220) receives a generic resource assignment without prior knowledge or expectation of the assignment details (e.g., bandwidth, modulation scheme). In such a case, as discussed above, average values can address possible variations in assignments and therefore be a suitable choice. Approaches (2) and (3), which monitor the tail of distributions of measured interference levels, can be adequate to maintain integrity of control channel communication. Effective interference approach (4) can be more suitable for large resource assignments in which, for example, a large number of subcarriers is allocated to an access terminal (e.g., access terminal 220). In such scenario, a mobile station can likely observe several realizations of channel conditions at different resources and, thus, can benefit from an effective determination of the interference level.

As discussed above in connection with FIG. 2, an access terminal 220 can receive an indication of excessive other-sector interference over a forward link 295. In addition, an access terminal (e.g., 220) can receive OSI indications from a set of multiple non-serving access points in an active set acquired by the terminal, or APs outside such an acquired active set (via long-range, or large coverage, FL channels, such as F-OSICH in 3 G UMB; see above). Furthermore, as discussed in connection with FIGS. 3 and 4, such an indication can correspond to either a slow OSI or a fast OSI. Next, the interaction of such disparate indications and their relation to interference and resource management is discussed, employing FIG. 5 where appropriate for illustrative purposes. FIG. 5A and 5B are diagrams 500 and 550, respectively, which represent offset values (Δs) and their response to an OSI indication 503.

Upon the conveying of an initial resource assignment for a traffic channel transmission over a forward link (for example, FL 265) to an access terminal (e.g., AT 220) by a serving access point (e.g., AP 250), a reference level of the assigned resource (e.g., RREF 506 in FIG. 5A and 5B) can be retained at the terminal. A memory (e.g., memory 232) can maintain such a reference level in storage. Such a reference level can be adjusted in terms of offsets Δ that respond to slow OSI and fast OSI indications, thus managing the terminal's resource assignment. It is noted that a terminal (e.g., AT 220) can determine to respond to an OSI indication 503 if it was originated by interference generated by the terminal's own transmission, or a terminal can determine to respond to any OSI indication 503 that is broadcasted by an access point (e.g., AP 280)—even though such indication can correspond to time-frequency resources not employed by the terminal. Furthermore, such determination can include identifying the time-frequency resources corresponding to the OSI indication. Offset adjustment can be employed to exploit advantageous channel conditions, such as high CQI, or available antennas at an access point. Thus, a terminal can further employ CQI and other available resources in order to determine whether to adjust the offset value in response to the OSI indication 503. Δ can be measured in DBs. In an aspect Δ generation component 224 determines the magnitude of the offset value. It is noted that when the managed communication resource is power, or power spectral density, the level of interference inflicted by the access terminal on the non-serving sectors can be mitigated. In particular, access terminal (e.g., terminal 220) can compute its transmit power or power spectral density related to a traffic channel (e.g., in 3G UMB, reverse data channel (R-DCH)) by adding appropriate offset value Δ 515 to the reference level (e.g., RREF 506).

In an aspect, an access terminal (e.g., AT 220) may maintain only one Δ value, which is adjusted based on both a slow (or regular) OSI indication 512 and a fast OSI indication 509. FIG. 5A illustrates such scenario: offset Δ 515 is increased by a value dΔ 518 to offset Δ' 521. Alternatively, or in addition, an access terminal (e.g. AT 220) can retain two or more Δvalues, including one slow OSI Δ value—illustrated with $\Delta_S$ 553 in FIG. 5B—, which can be adjusted based on a regular OSI indication (e.g., $\langle I \rangle^{(SLOW)}$ 512); and one or more fast OSI offset values—illustrated with $\Delta_{F(1)}$-$\Delta_{F(P)}$ in FIG. 5B—, which can be adjusted based on fast OSI indications (e.g., $\langle I \rangle^{(FAST)}$ 509). In FIG. 5B, slow and fast adjusted offset values are illustrated, respectively, with $\Delta'_S$ 559 and $\Delta'_{F(1)}$-$\Delta'_{F(P)}$, $562_1$-$562_P$. It is noted that in the case multiple offset values are employed to adjust a resource assignments, the adjusted value of the resource is determined jointly based on $\langle I \rangle^{(SLOW)}$ and $\langle I \rangle^{(FAST)}$—which are determined according to at least one of approaches (1)-(4) discussed above. It should be appreciated that in the case that a terminal maintains more than one fast OSI Δ values (e.g. values $556_1$-$556_P$, and $562_1$-$562_P$), each $\Delta_{F(J)}$ can correspond to a different reverse link interlace, frame, assignment, etc. Furthermore, such diversity of fast OSI offset values facilitates maintaining a resource level at its current value in those time intervals, e.g. interlaces, wherein no significant changes on an interference metric is detected. It is noted that such diversity can be further expanded by retaining offset values per subcarrier (see FIG. 4).

Before proceeding to describe algorithms suitable for offset adjustment, it is noted that in order to prevent the fast OSI Δ adjustments (e.g., values $\Delta_{F(1)}$-$\Delta_{F(P)}$) from interfering with the regular delta-based resource management (e.g., power control operation and interference mitigation), access terminal (e.g., AT 220) can limit the range of fast offset values from above to the slow OSI Δ value (e.g. $\Delta_S$). In cases where signal distortions caused by transmission over a physical channel result in loss of orthogonality, and hence intra-sector interference, a resource management (e.g., power control algorithm) can also incorporate requirements on the dynamic range of the received signal, and limit the minimum ($\Delta_{MIN}$, 524 in FIGS. 5A and 5B) and maximum ($\Delta_{MAX}$, 527 in FIGS. 5A and 5B) values that offsets can adopt. Such minimum and maximum offset values can, in turn, be adjusted based on information on interference level broadcasted from the serving-sector (e.g., 250) of the access terminal.

Regarding offset adjustment, e.g. determining whether or not to perform an adjustment—increase, decrease or preserve an offset value—and/or the magnitude of an adjustment, e.g. dΔ 518, an access terminal (e.g., AT 220) can employ two approaches: (i) probabilistic and (ii) deterministic. Either type of approach can be used for each offset value (e.g., $\Delta_S$ 553 and $\Delta_{F(1)}$-$\Delta_{F(P)}$ $556_1$-$556_P$) that is retained in the access terminal. In case (i), assuming for simplicity, and not by way of limitation, that a single offset is retained (FIG. 5A), upon receiving slow and fast OSI indications (e.g., $\langle I \rangle^{(SLOW)}$ 512 and $\langle I \rangle^{(FAST)}$ 509), access terminal can determine via Δ generation component 224 the magnitude and sign of the offset value adjustment, e.g. dΔ 518, based on a probability distribution $P=P(\Delta, \langle I \rangle^{(SLOW)}, \langle I \rangle^{(FAST)}, rCQI)$. Here, $rCQI = CQI^{(NSS)}/CQI^{(SS)}$, indicating the channel strength (measured by a channel quality indicator (CQI)) of a non-serving sector (NNS), e.g., the other sector where a terminal causes interference, relative to the terminal's serving sector (SS). The magnitude and sign of the issued dΔ 518 is such that the adjusted offset, $\Delta'_S$ 559, resides within the bounds imposed by $\Delta_{MIN}$ 524 and $\Delta_{MAX}$ 527. Alternatively, the magnitude of dΔ 518 can be specified a priori and the probability distribution P employed to establish whether or not to perform an adjustment. It should be appreciated that within such probabilistic approach the response of an access terminal to the excessive OSI indication can be to preserve (e.g., not decrease) the available communication resources. Due to such feature, probabilistic approach (i) can be well suited for a fully loaded system, wherein slow OSI indications fluctuate around a quasiequilibrium value and stochastic responses of several wireless devices to OSI indications average out, resulting in overall reduction of interference via adjustment of communication resources. A processor (e.g., processor 228) can contain the probability distribution and issue the stochastic value for the offset adjustment. Values of offsets and OSI indication can be stored in a memory (e.g., memory 232) for record keeping and analysis of system behavior.

In case of deterministic approach (ii), an access terminal (e.g., 220) can utilize an algorithm determined by a weight function $w=w(\langle I \rangle^{(SLOW)}, \langle I \rangle^{(FAST)}, rCQI)$ that sets the magnitude of a specific discrete (step) value dΔ 518 for upward or downward offset adjustment. It should be appreciated that such value can be determined by a processor (e.g., processor 228) in the access terminal. As in approach (i), values of offsets and OSI indications can be stored in a memory (e.g., memory 232 or 262) for record keeping and analysis of system behavior.

It is noted that while Δ generation component 224 can employ deterministic approach (i) for adjusting slow OSI and fast OSI offsets, probabilistic approach (ii) can be avoided for fast OSI offset adjustment. In an aspect, when a fast OSI indication is received it can be desirable to deterministically adjust the communication resources in order to reduce interference in neighboring sectors. In a bursty situation, a stochastic adjustment of the resources level can lead to an increase of the interference inflicted by a bursty access terminal. An access terminal (e.g., AT 220) that receives an excessive OSI indication can utilize substantially the same algorithm with substantially the same set of parameters for both slow OSI and fast OSI Δ adjustments. Alternatively, or in addition, an access terminal can use different algorithms and/or different sets of parameters to adjust different Δ values ($Δ_S$ 553, $Δ_{F(1)}$-$Δ_{F(P)}$ 556$_1$-556$_P$). As an example, parameters that may need to be different for slow and fast delta adjustments are up and down step sizes (e.g. dΔ 518), and different decision thresholds (e.g., $I_{TH}$ 320).

Figure 6:
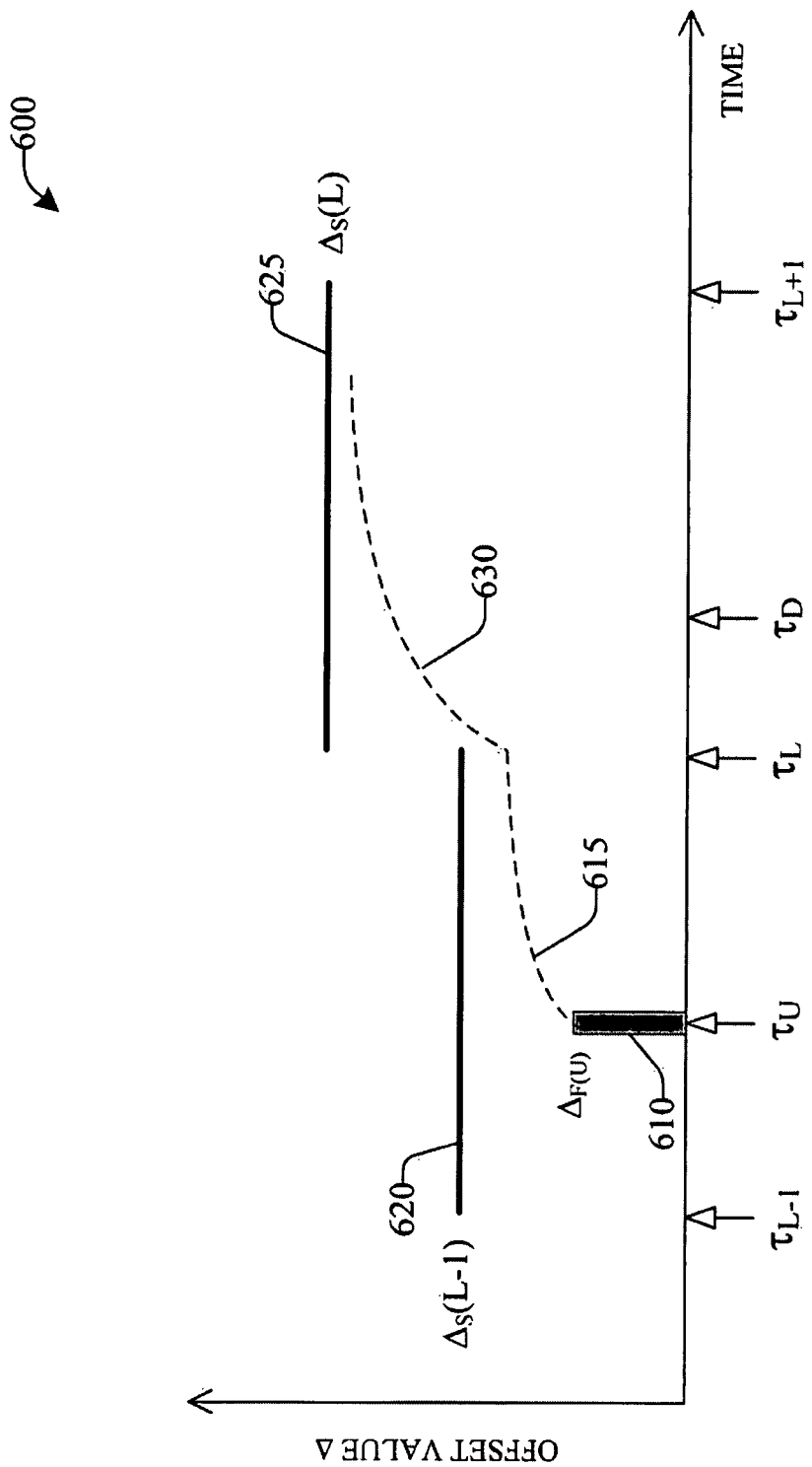
FIG. 6 illustrates a time evolution of a fast other-sector interference offset value in accordance with one aspect of the subject specification.

In another aspect, Δ generation component 224 can employ values of slow OSI offsets as upper bounds to fast OSI offsets, which are used to generate adjustment to the offsets retained in an access terminal (e.g., AT 220) that receives an indication of excessive OSI. In yet another aspect, an access terminal can employ a fast OSI indication to adjust offset values. However, a serving access point (e.g., AP 250) can implement an algorithm to drive the fast OSI Δ value towards a slow OSI Δ value since a fast OSI offset value is generated only when a bursty terminal is present in the system, yet retained in an access terminal, as discussed above. It should be noted that retaining a fast OSI value over an extended period of time, in which bursty transmissions are absent, can disadvantageously affect the determination of long OSI offsets. This is illustrated in FIG. 6, which is a diagram 600 wherein a fast OSI Δ value $Δ_{F(U)}$ 610 generated at a time $τ_U$ is driven (dashed line 615) by, e.g. serving access point 250 toward the upper bound value given by slow OSI offset $Δ_{S(L-1)}$ 620 generated at time $τ_{L-1}$. At time $τ_L$ a new slow OSI offset $Δ_{S(L)}$ 625 is generated, e.g., by Δ generation component 224, and $Δ_{F(U)}$ is once more driven (dashed line 630) toward the newly determined slow offset. A serving access point can continue driving fast offset $Δ_{F(U)}$ 610 until a new bursty transmission takes place in the system and a new fast OSI Δ value is generated.

Once offset adjustments have been performed, via Δ generation component 224, an access terminal can communicate the values of the updated offsets (e.g., Δ' 521 in FIG. 5A, and $Δ'_S$ 559, $Δ'_{F(1)}$-$Δ'_{F(P)}$ 562$_1$-562$_P$ in FIG. 5B) to its serving access point (e.g., AP 250) as suggested values for subsequent resource assignments.

Figure 7:
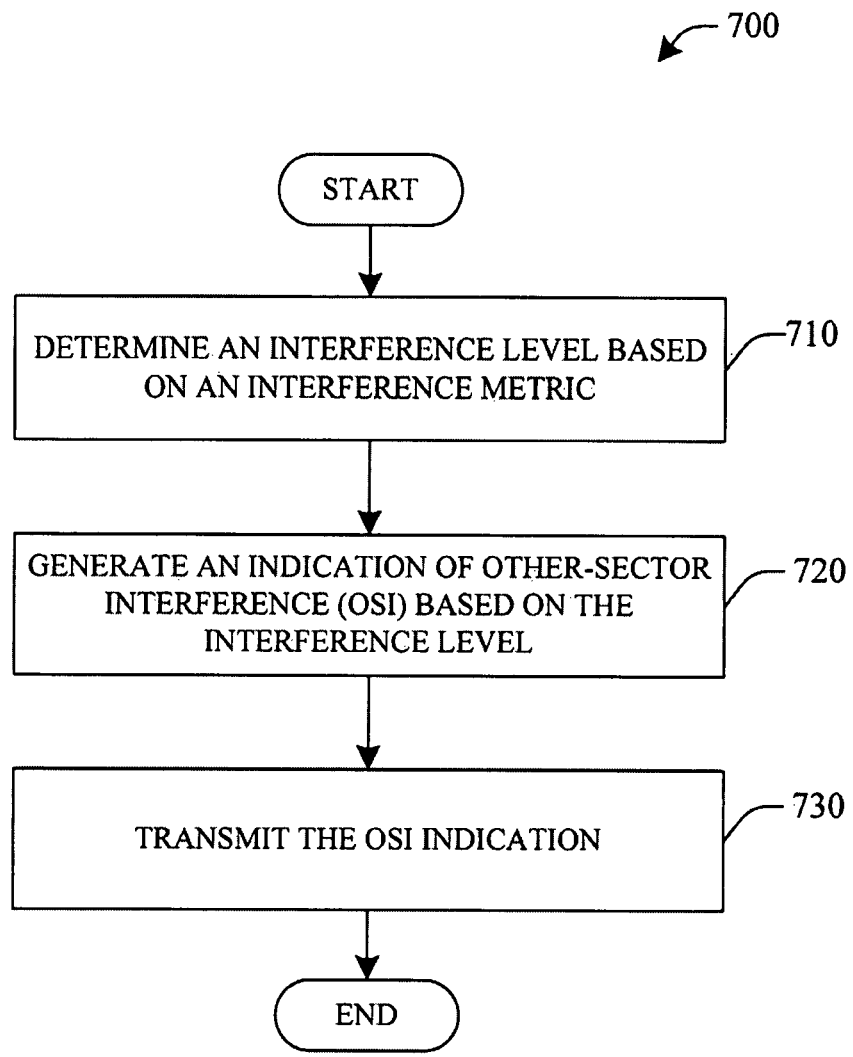
FIG. 7 presents a flowchart of an example method for producing an indication of other system interference in a wireless system.
Figure 8:
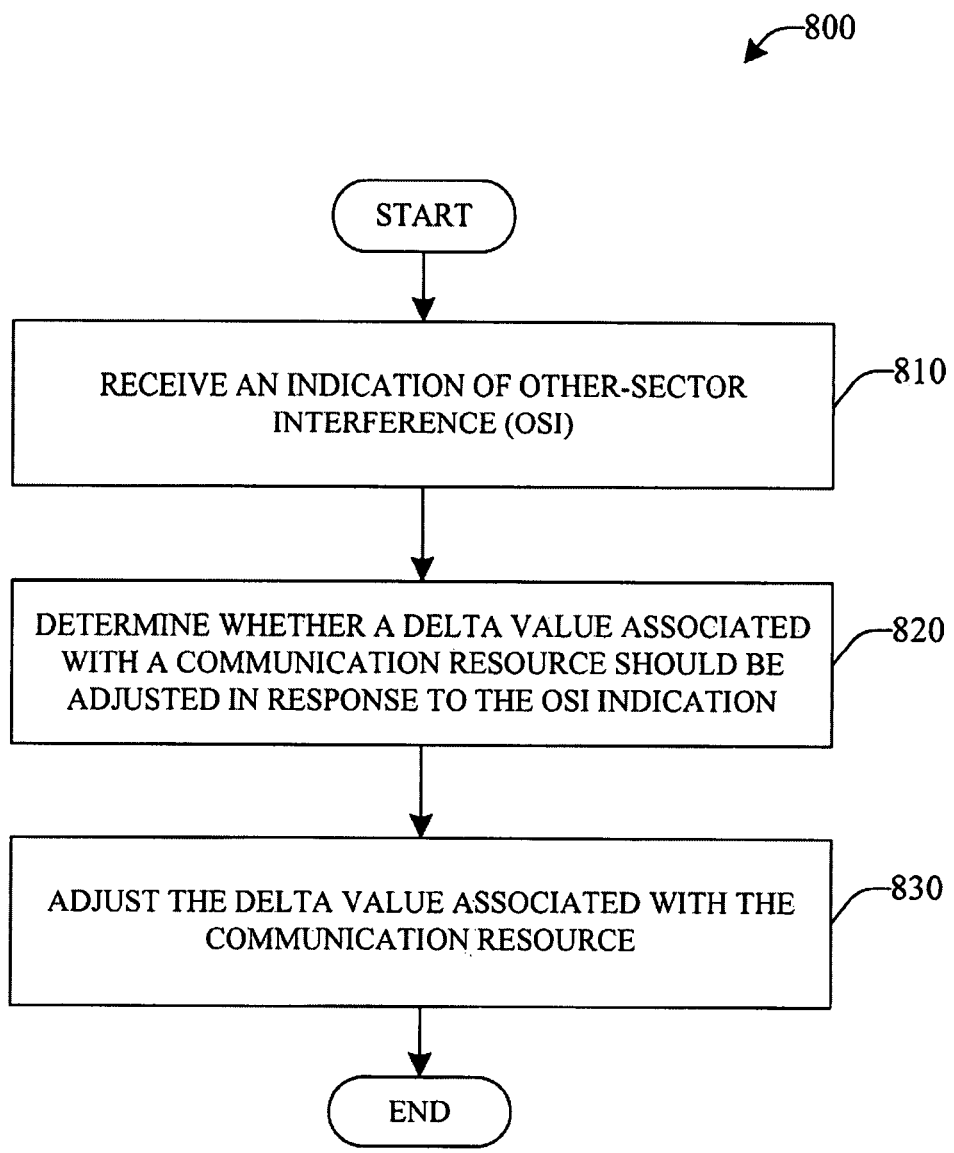
FIG. 8 presents a flowchart of an example method for managing interference and communication resources in a wireless system.

In view of the example systems shown and described above, methodologies that may be implemented in accordance with the disclosed subject matter, will be better appreciated with reference to the flow charts of FIGS. 7 and 8. While, for purposes of simplicity of explanation, the methodologies are shown and described as a series of blocks, it is to be understood and appreciated that the claimed subject matter is not limited by the number or order of blocks, as some blocks may occur in different orders and/or concurrently with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component, . . . ). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 7 presents a flowchart of an example method 700 for producing an OSI indication, which can be necessary to manage resources and interference in a wireless system. At act, 710 an interference level is determined based on an interference metric. The selected metric can be a performance metric such as signal-to-interference ratio. Determination of an interference level based on the selected interference metric can involve measurement of interference levels on various time-frequency resources. In an aspect, fast short-term assessment as well as slow long-term determination can be conducted. Interference levels can also be determined for specific time-domain resources such as specific frames (FIG. 3) and interlaces, as well as subcarriers in frequency domain (FIG. 4). Such determination can be associated with fast assessments. As an example, non-serving access point 280 can conduct such interference level determinations, employing an OSI generation component (e.g. component 284) coupled to a processor (e.g., processor 288). The processor can facilitate measurements of interference levels, and computation of effective interference metric such as averages and system-capacity-based interference levels. At act 720, an OSI indication is generated based on the determined interference level. In an aspect, generating an OSI indication can involve comparing a determined effective interference level to a threshold interference level (FIGS. 3 and 4) that can be established by a service provider of a wireless communication system. The OSI indication is transmitted in act 730. In aspect, a non-serving access point (e.g., AP 280) conveys the OSI indication to an access terminal (e.g., AT 220) over a dedicated forward link (e.g., FL 295) physical channel. Such channel can be embodied in a fast OSI control channel.

FIG. 8 presents a flowchart of an example method 800 for managing communication resources in a wireless system. At act 810, an indication of other-sector interference (OSI) is received. In an aspect, such OSI indication is received from a non-serving access point that is in the active set of an access terminal. The OSI indication can correspond to an indication determined over a long period of time, involving one or more superframes (FIG. 3), or the indication can correspond to a short-term indication, determined over a single frame (FIG. 3). At 820, it is determined whether an offset value associated with a communication resource should be adjusted in response to the OSI indication. The determination can be made based on the magnitude of an interference excess with respect to an interference threshold, channel quality indicators, or cell traffic load. In another aspect, the communication resource can correspond to a transmission power or power spectral density (PSD). Alternatively, or in addition, the communication resource can correspond to a modulation scheme, a bandwidth, a number of subcarriers, cyclic prefix duration, etc. At 830, the offset associated with the communication resource is adjusted. In the case the communication resource is power or PSD, other-sector interference over the reverse link of a transmitting access terminal (FIG. 2) can be mitigated by reducing the power level employed by the access terminal (e.g., AT 220) to communicate. In yet another aspect, adjusting the Δ value can be accomplished employing a probabilistic or deterministic algorithm. An access terminal (e.g., access terminal 220) can employ substantially the same algorithm to adjust offsets associated with slow OSI indications and fast OSI indications.

Figure 9:
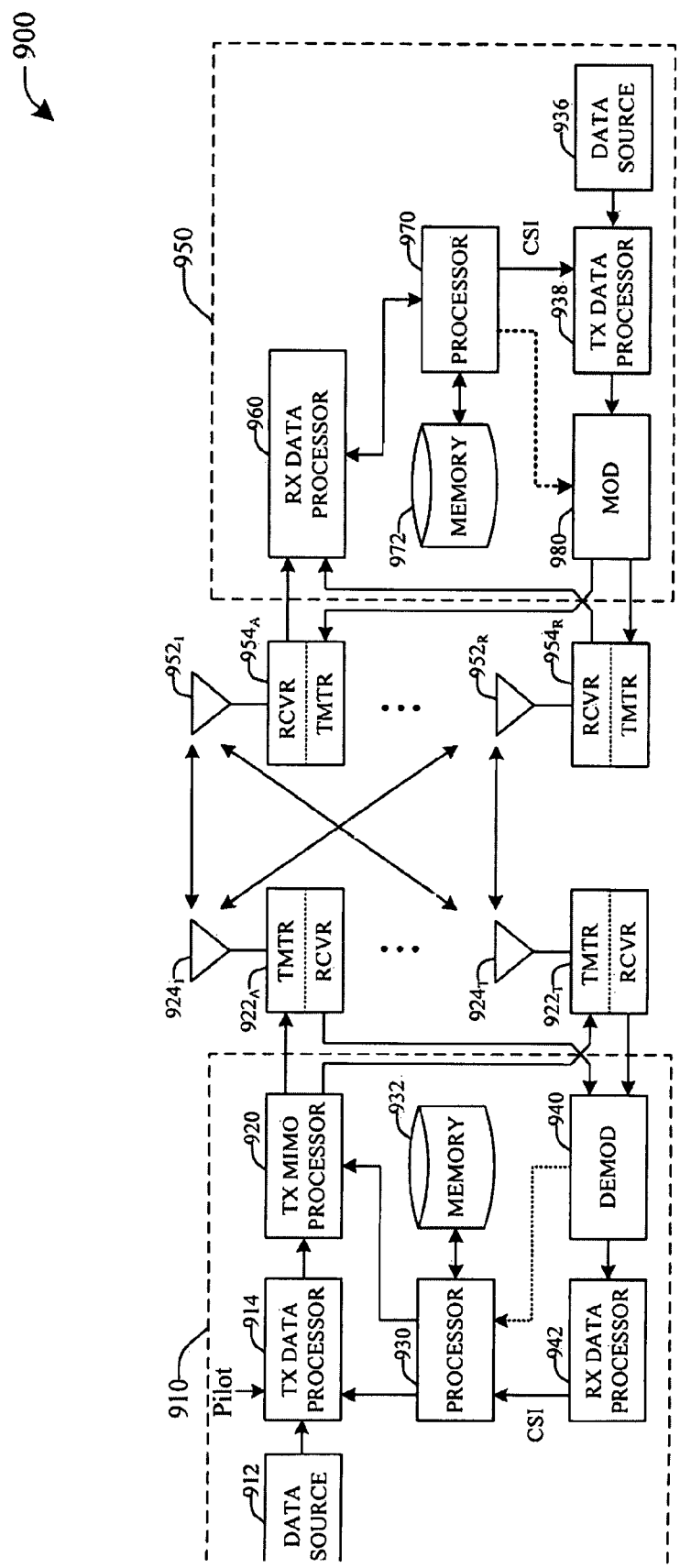
FIG. 9 is a block diagram of an example multiple-input multiple-output (MIMO) transmitter and a receiver that can exploit interference adjustment.

FIG. 9 is a block diagram 900 of an embodiment of a transmitter system 910 (such as base station 140) and a receiver system 950 (e.g., access terminal 220) in a multiple-input multiple-output (MIMO) system that can provide for cell/sector communication in a wireless communication environment in accordance with one or more aspects set forth herein. At the transmitter system 910, traffic data for a number of data streams can be provided from a data source 912 to transmit (TX) data processor 914. In an embodiment, each data stream is transmitted over a respective transmit antenna. TX data processor 914 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and can be used at the receiver system to estimate the channel response. The multiplexed pilot and coded data for each data stream is then modulated (e.g., symbol mapped) based on a particular modulation scheme (e.g., binary phase-shift keying (BPSK), quadrature phase-shift keying (QPSK), multiple phase-shift keying (M-PSK), or m-order quadrature amplitude modulation (M-QAM)) selected for that data stream to provide modulation symbols. The data rate, coding, and modulation for each data stream may be determined by instructions executed by processor 930, the instructions as well as the data may be stored in memory 932. In addition, in accordance with an aspect of the present innovation, a transmitter can switch modulation schemes depending on a computed delta value in response to an indication of excessive OSI.

The modulation symbols for all data streams are then provided to a TX MIMO processor 920, which may further process the modulation symbols (e.g. OFDM). TX MIMO processor 920 then provides NT modulation symbol streams to $N_T$ transceiver (TMTR/RCVR) $922_A$ through $922_T$. In certain embodiments, TX MIMO processor 920 applies beamforming weights (or precoding) to the symbols of the data streams and to the antenna from which the symbol is being transmitted. Each transceiver 922 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers $922_A$ through $922_T$ are then transmitted from $N_T$ antennas $924_1$ through $924_T$, respectively. At receiver system 950, the transmitted modulated signals are received by $N_R$ antennas $952_1$ through $952_R$ and the received signal from each antenna 952 is provided to a respective transceiver (RCVR/TMTR) $954_A$ through $954_R$. Each transceiver $954_1$-$954_R$ conditions (e.g., filters, amplifies, and downconverts) a respective received signal, digitizes the conditioned signal to provide samples, and further processes the samples to provide a corresponding "received" symbol stream.

An RX data processor 960 then receives and processes the $N_R$ received symbol streams from $N_R$ transceivers $954_1$-$954_R$ based on a particular receiver processing technique to provide $N_T$ "detected" symbol streams. The RX data processor 960 then demodulates, deinterleaves, and decodes each detected symbol stream to recover the traffic data for the data stream. The processing by RX data processor 960 is complementary to that performed by TX MIMO processor 920 and TX data processor 914 at transmitter system 910. A processor 970 periodically determines which pre-coding matrix to use, such a matrix can be stored in memory 972. Processor 970 formulates a reverse link message comprising a matrix index portion and a rank value portion. Memory 972 may store instructions that when executed by processor 970 result in formulating the reverse link message. The reverse link message may comprise various types of information regarding the communication link or the received data stream, or a combination thereof. As an example, such information can comprise an adjusted communication resource, an offset for adjusting a scheduled resource, and information for decoding a data packet format. The reverse link message is then processed by a TX data processor 938, which also receives traffic data for a number of data streams from a data source 936, modulated by a modulator 980, conditioned by transceiver $954_A$ through $954_R$, and transmitted back to transmitter system 910.

At transmitter system 910, the modulated signals from receiver system 950 are received by antennas $924_1$-$924_T$, conditioned by transceivers $922_A$-$922_T$, demodulated by a demodulator 940, and processed by a RX data processor 942 to extract the reserve link message transmitted by the receiver system 950. Processor 930 then determines which pre-coding matrix to use for determining the beamforming weights and processes the extracted message.

Single-user MIMO mode of operation corresponds to the case in which a single receiver system 950 communicates with transmitter system 910, as illustrated in FIG. 9 and according to the operation described above. In such a system, the $N_T$ transmitters $924_1$-$924_T$ (also known as TX antennas) and NR receivers $952_1$-$952_R$ (also known as RX antennas) form a matrix channel (e.g., Rayleigh channel, or Gaussian channel) for wireless communication. The SU-MIMO channel is described by a $N_R \times N_T$ matrix of random complex numbers. The rank of the channel equals the algebraic rank of the $N_R \times N_T$ channel. In space-time or space-frequency coding, the rank equals the number of data streams, or layers, that are sent over the channel. It should be appreciated that the rank is at most equal to min $\{N_T, N_R\}$. A MIMO channel formed by the $N_T$ transmit and $N_R$ receive antennas may be decomposed into $N_V$ independent channels, which are also referred to as spatial channels, where $N_V \leq \min \{N_T, N_R\}$. Each of the $N_V$ independent channels corresponds to a dimension.

In one aspect, transmitted/received symbols with OFDM, at tone ω, can be modeled by:

$$y(\omega) = H(\omega)c(\omega) + n(\omega). \quad (1)$$

Here, $y(\omega)$ is the received data stream and is a $N_R \times 1$ vector, $H(\omega)$ is the channel response $N_R \times N_T$ matrix at tone ω (e.g., the Fourier transform of the time-dependent channel response matrix h), $c(\omega)$ is an $N_T \times 1$ output symbol vector, and $n(\omega)$ is an $N_R \times 1$ noise vector (e.g., additive white Gaussian noise). Precoding can convert a $N_V \times 1$ layer vector to $N_T \times 1$ precoding output vector. $N_V$ is the actual number of data streams (layers) transmitted by transmitter 910, and $N_V$ can be scheduled at the discretion of the transmitter (e.g., access point 250) based at least in part on channel conditions and the rank reported by the terminal. It should be appreciated that $c(\omega)$ is the result of at least one multiplexing scheme, and at least one pre-coding (or beamforming) scheme applied by the transmitter. Additionally, $c(\omega)$ is convoluted with a power gain matrix, which determines the amount of power transmitter 910 allocates to transmit each data stream $N_V$. It should be appreciated that such a power gain matrix can be a resource that is assigned to access terminal 220, and it can be managed through adjustment of offsets as described herein. In view of the FL/RL reciprocity of the wireless channel, it should be appreciated that a transmission from MIMO receiver 950 can also be modeled in the fashion of Eq. (1), including substantially the same elements. In addition, receiver 950 can also apply pre-coding schemes prior to transmitting data in the reverse link.

In system 900 (FIG. 9), when $N_T = N_R = 1$, the system reduces to a single-input single-output (SISO) system that can provide for sector communication in a wireless communication environment in accordance with one or more aspects set forth herein.

Figure 10:
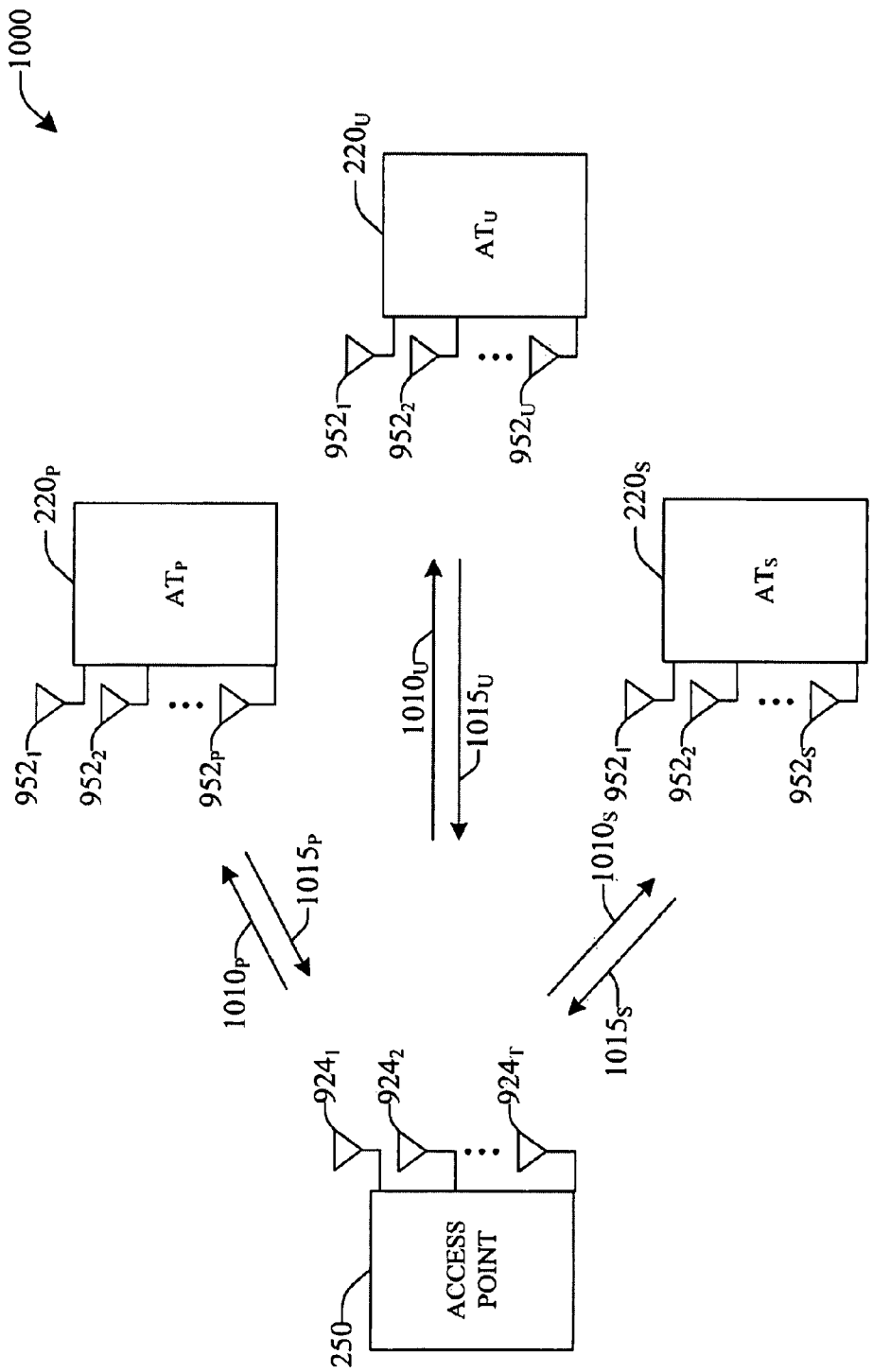
FIG. 10 is a block diagram of an example multiple-user MIMO configuration.

FIG. 10 illustrates an exemplary multiple-user MIMO system 1000 in which three ATs $220_P$, $220_U$, and $220_S$ communicate with an access point 250. Access point has $N_T$ TX antennas $924_1$-$924_T$, and each of the ATs has multiple RX antennas; namely, $AT_P$ has $N_P$ antennas $952_1$-$952_P$, $AP_U$ has $N_U$ antennas $952_1$-$952_U$, and $AP_S$ has $N_S$ antennas $952_1$-$952_S$. Communication between terminals and the access point is effected through uplinks $1015_P$, $1015_U$, and $1015_S$. Similarly, downlinks $1010_P$, $1010_U$, and $1010_S$ facilitate communication between access point 250 and terminals $AT_P$, $AT_U$, and $AT_S$, respectively. Additionally, communication between each terminal and base station is implemented in substantially the same manner, through substantially the same components, as illustrated in FIG. 9 and its corresponding description. Because terminals can be located in substantially different locations within the cell serviced by access point 250, each user equipment $220_P$, $220_U$, and $220_S$ has its own matrix channel $h_\alpha$ and response matrix $H_\alpha$ ($\alpha$=P, U, and S), with its own rank. Intra-cell interference can be present due to the plurality of users present in the cell serviced by the base station 250. Although illustrated with three terminals in FIG. 10, it should be appreciated that a MU-MIMO system can comprise any number of terminals, indicated below with index k. Each of the access terminals $220_P$, $220_U$, and $220_S$ can respond to indications of excessive other-sector interference, and each can communicate to AT 250 one or more adjusted communication resources, offsets for adjusting a scheduled resource, as well as information for decoding adapted data packet formats employed for transmission in view of the OSI indication. As discussed above, AT 250 can reschedule resources for each of the terminals $220_P$, $220_U$, and $220_S$ accordingly and independently of each other's resource assignment.

In one aspect, transmitted/received symbols with OFDM, at tone ω and for user k, can be modeled by:

$$y_k(\omega)=H_k(\omega)c_k(\omega)+H_k(\omega)\Sigma'c_m(\omega)+n_k(\omega). \quad (2)$$

Here, symbols have the same meaning as in Eq. (1). It should be appreciated that due to multi-user diversity, other-user interference in the signal received by user k is modeled with the second term in the left-hand side of Eq. (2). The prime (') symbol indicates that transmitted symbol vector $C_k$ is excluded from the summation. The terms in the series represent reception by user k (through its channel response $H_k$) of symbols transmitted by a transmitter (e.g., access point 250) to the other users in the cell.

Figure 11:
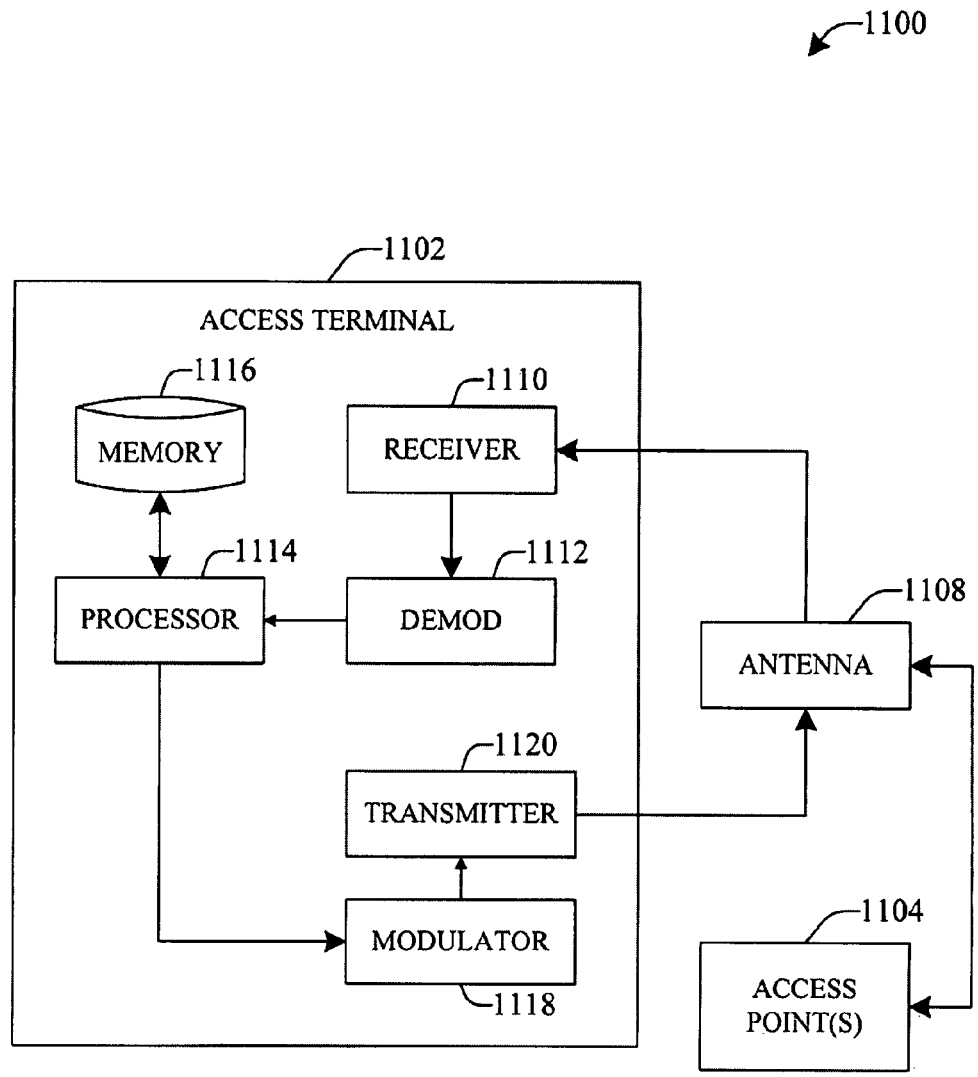
FIG. 11 is a block diagram of an example system that coordinates interference and resource management in a wireless communication system.

FIG. 11 is a block diagram of a system 1100 that coordinates reverse link communication resources and interference level maintenance in a wireless communication system in accordance with various aspects described herein. In one example, system 1100 includes an access terminal 1102. As illustrated, access terminal 1102 can receive signal(s) from one or more access points 1104 and transmit to the one or more access points 1104 via an antenna 1108. Additionally, access terminal 1102 can comprise a receiver 1110, or substantially any other electronic appliance, that receives information from antenna 1108. In one example, receiver 1110 can be operatively associated with a demodulator (Demod) 1112 that demodulates received information. Demodulated symbols can then be analyzed by a processor 1114. Processor 1114 can be coupled to memory 1116, which can store data and/or program codes related to access terminal 1102. Additionally, access terminal 1102 can employ processor 1114, or substantially any other electronic appliance, to perform methodologies 700, 800, and/or other appropriate methodologies. Access terminal 1102 can also include a modulator 1118 that can multiplex a signal for transmission by a transmitter 1120 via antenna 1108 to one or more access points 1104.

Figure 12:
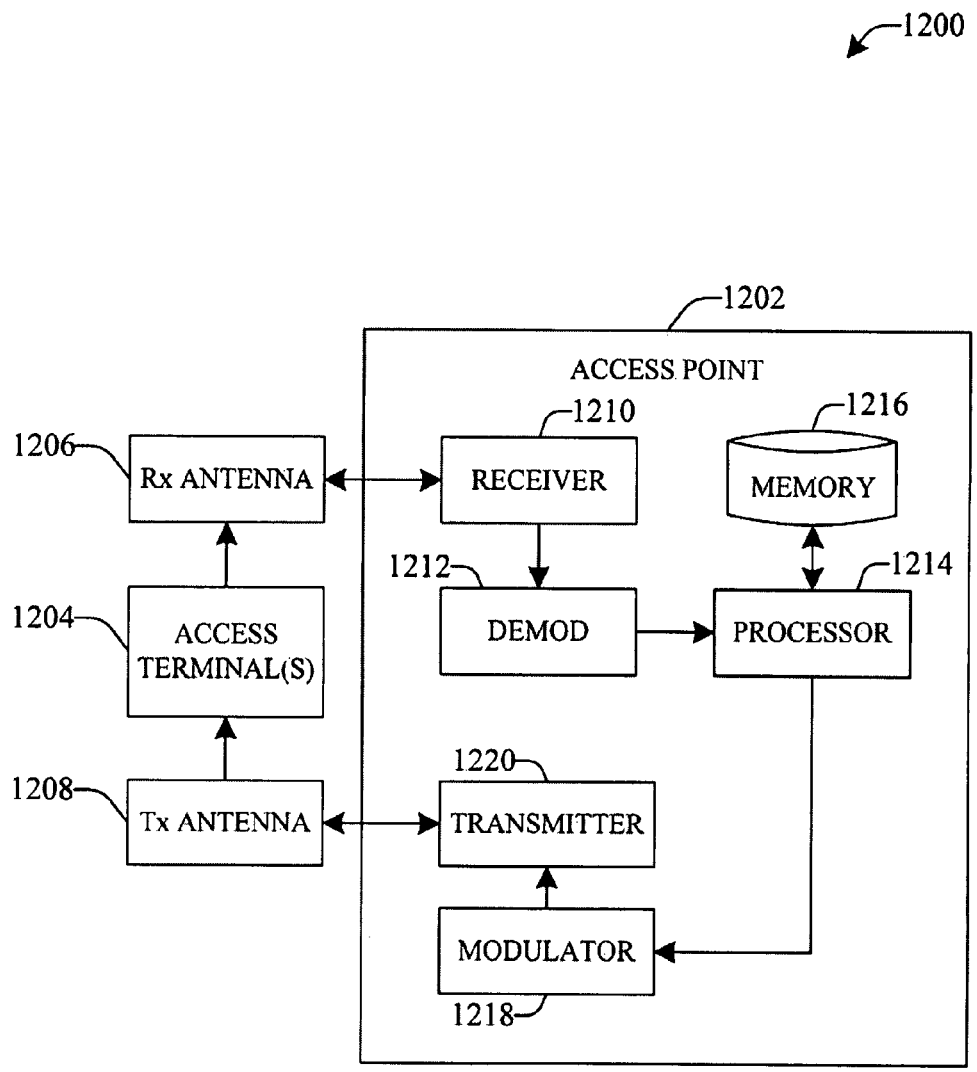
FIG. 12 is a block diagram of a system that coordinates reverse link resource and interference management in a wireless communication system in accordance with various aspects.

FIG. 12 is a block diagram of a system 1200 that coordinates reverse link communication resource and interference management in a wireless communication system in accordance with various aspects described herein. In one example, system 1200 includes a base station or access point 1202. As illustrated, access point 1202 can receive signal(s) from one or more access terminals 1204 via a receive (Rx) antenna 1206 and transmit to the one or more access terminals 1204 via a transmit (Tx) antenna 1208.

Additionally, access point 1202 can comprise a receiver 1210 that receives information from receive antenna 1206. In one example, the receiver 1210 can be operatively associated with a demodulator (Demod) 1212, or substantially any other electronic appliance, that demodulates received information. Demodulated symbols can then be analyzed by a processor 1214. Processor 1214 can be coupled to memory 1216, which can store information related to code clusters, access terminal assignments, lookup tables related thereto, unique scrambling sequences, and/or other suitable types of information. Access point 1202 can also include a modulator 1218 that can multiplex a signal for transmission by a transmitter 1220 through transmit antenna 1208 to one or more access terminals 1204.

Next, systems that can enable aspects of the disclosed subjected matter are described in connection with FIGS. 13 and 14. Such systems can include functional blocks, which can be functional blocks that represent functions implemented by a processor or an electronic machine, software, or combination thereof (e.g. firmware).

Figure 13:
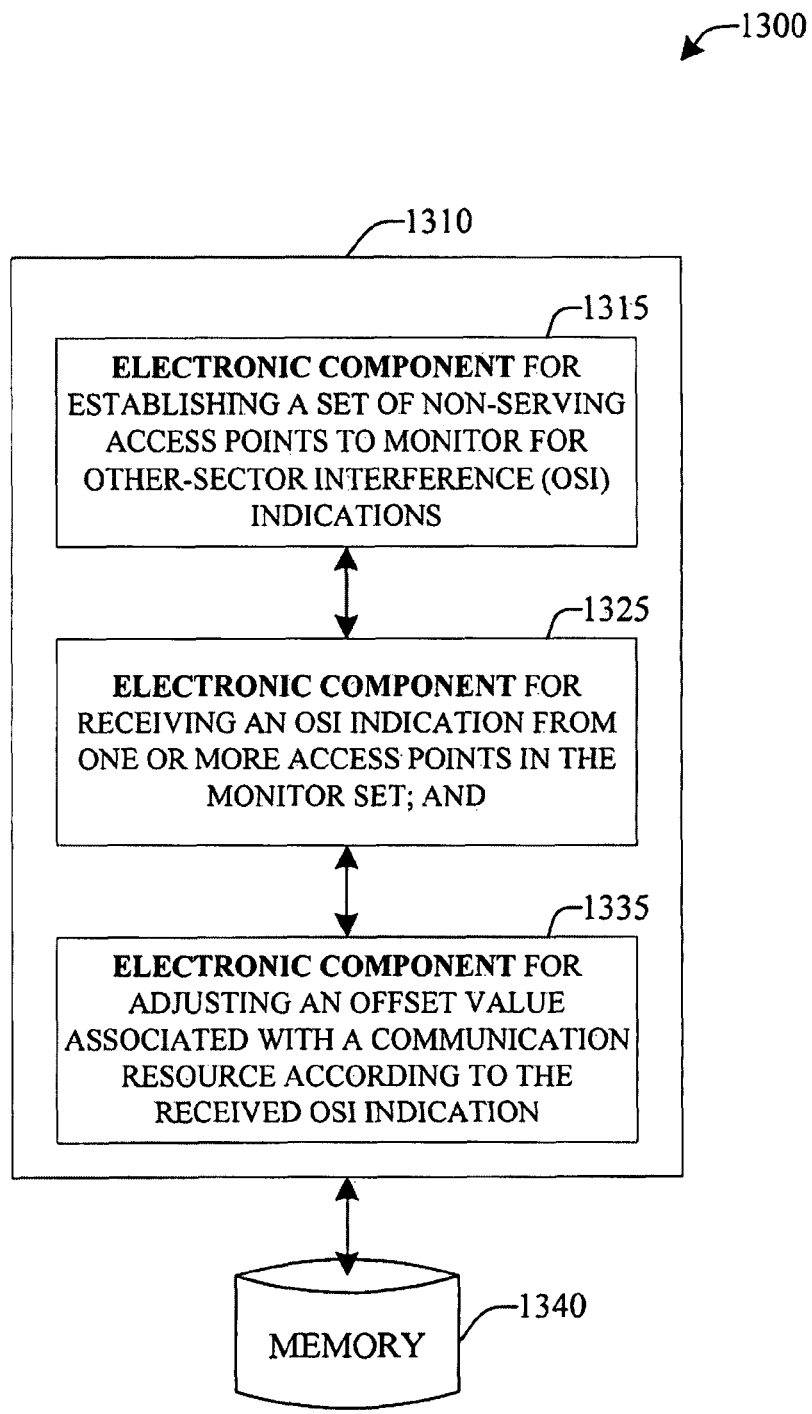
FIG. 13 illustrates a block diagram of an example system that enables managing resources in a wireless communication in accordance with an aspect of the subject disclosure.

FIG. 13 illustrates a block diagram of an example system 1300 that enables managing resources in a wireless communication system. System 1300 can reside, at least partially, within a wireless terminal (e.g., access terminal 220). System 1300 includes a logical grouping 1310 of electronic components that can act in conjunction. In an aspect, logical grouping 1310 includes an electronic component 1315 for establishing a set of non-serving access points (APs) to monitor for other-sector interference indications; an electronic component 1325 for receiving an OSI indication from one or more APs in the monitor set; and an electronic component 1335 for adjusting an offset value associated with a communication resource according to the received OSI indication.

System 1300 can also include a memory 1340 that retains instructions for executing functions associated with electrical components 1315 and 1325, as well as measured and computed data that may be generated during executing such functions. While shown as being external to memory 1340, it is to be understood that one or more of electronic components 1315, 1325, and 1335 can exist within memory 1340.

Figure 14:
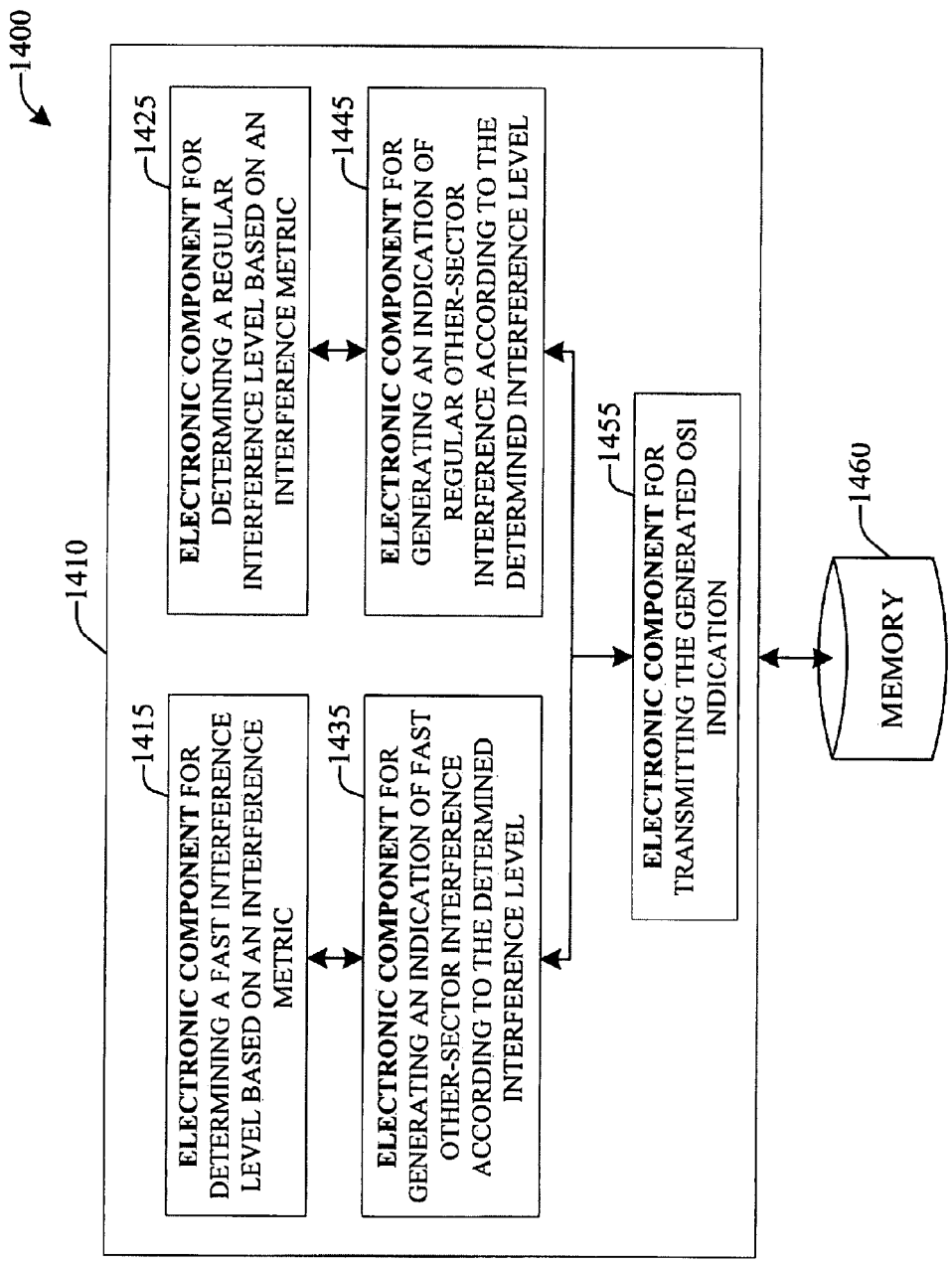
FIG. 14 illustrates a block diagram of an example system 1300 that enables interference management in a wireless system in accordance with an aspect of the subject disclosure.

FIG. 14 illustrates a block diagram of an example system 1400 that enables interference management in a wireless system by generating and issuing an indication of excess other sector interference according to determined interference level. System 1400 can reside, at least partially, within a base station (e.g. access point 280). System 1400 includes a logical grouping 1410 of electronic components that can act in conjunction. In an aspect, logical grouping 1410 includes an electronic component 1415 and 1425 for determining, respectively, a fast interference level based on an interference metric and a slow interference level based on an effective interference metric. In addition, logical grouping 1410 includes component 1435 and 1445 for generating, respectively, an indication of fast other-sector interference (OSI) according to the fast interference level; and an indication of slow other-sector interference according to the slow interference level. Electronic component 1455 for transmitting the generated OSI indication can also be included within logical grouping 1410.

Moreover, example system 1400 can also include a memory 1460 that retains instructions for executing functions associated with electrical components 1415, 1425, 1435, 1445, and 1455, as well as measured and computed data that may be generated during executing such functions. While shown as being external to memory 1460, it is to be understood that one or more of electronic components 1415, 1425, 1435, 1445, and 1455 can exist within memory 1460.

It is to be understood that the embodiments described herein can be implemented by hardware, software, firmware, middleware, microcode, or any combination thereof. When the systems and/or methods are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

As it is employed herein, the word "processor" can refer to a classical architecture or a quantum computer. Classical architecture comprises, but is not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a programmable logic controller (PLC), a complex programmable logic device (CPLD), or a field programmable gate array (FPGA). Quantum computer architecture may be based on qubits embodied in gated or self-assembled quantum dots, nuclear magnetic resonance platforms, superconducting Josephson junctions, etc. Processors can exploit nano-scale architectures such as, but not limited to, molecular and quantum-dot based transistors, switches and gates, in order to optimize space usage or enhance performance of user equipment.

Furthermore, in the subject specification, the term "memory" refers to data stores, algorithm stores, and other information stores such as, but not limited to, image store, digital music and video store, charts and databases. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems and/or methods herein are intended to comprise, without being limited to, these and any other suitable types of memory.

Further yet, as used in this disclosure, the term "electronic appliance" refers to an electronic entity that serves a specific purpose; examples of such purpose include, but are not limited to including, transmitting and receiving digital signals; transmitting and receiving radio-frequency electromagnetic radiation; processing digital signals, e.g. multiplexing/de-multiplexing, modulating, and splitting/concatenating digital bits; executing logic via processors as described supra that are part of the appliance or external to the electronic appliance; storing information in a memory as described supra that can be part of the electronic appliance or external to the electronic appliance; communicating with computers, either in a network or stand alone; executing code that causes the electronic appliance to perform specific acts; and the like.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus that facilities managing resources in a wireless communication system, the apparatus comprising:
  means for establishing a set of non-serving access point (APs) to monitor for other-sector interference indications;
  means for receiving an other-sector interference (OSI) indication that corresponds to fast OSI from one or more APs in the monitor set and corresponds to an interference metric determined in a sub-superframe scale;
  means for identifying the time-frequency resources corresponding to the OSI indication; and
  means for adjusting an offset value associated with a communication resource according to the received OSI indication and the time-frequency resources identified as corresponding to the OSI indication.

2. The apparatus of claim 1, the sub-superframe time-scale corresponds to one selected from the group consisting of one or more frames and one or more symbols.

3. A computer product having a non-transitory computer-readable medium comprising:
  code for causing a computer to receive an indication of excessive other-sector interference from a set of non-serving access points;
  code for causing a computer to identify wireless communication system time-frequency communication resources corresponding to the indication of excessive other-sector interference;

code for causing a computer to adjust an offset value associated with a communication resource assigned by an access point, based on the received indication of excessive other-sector interference and the identified time-frequency resources corresponding to the OSI indication; and code for causing a computer to communicate the adjusted offset value to an access point of the wireless communication system to update subsequent resource assignments.

4. A method for managing interference in a wireless system having time-frequency communication resources, comprising:

determining a plurality of average interference metrics of the system time-frequency communication resources, each of the average interference metrics based on a corresponding plurality of interference metrics, each of the interference metrics corresponding to a span in time-frequency;

generating a cumulative probability distribution function (CDF) based on said plurality of average interference metrics;

determining an interference level based on the CDF;

generating an indication of other-sector interference (OSI) based on the determined interference level; and transmitting the OSI indication.

5. The method of claim 4, wherein determining at least one of the average interference metrics includes averaging the interference metric in one or more subcarriers over at least one set selected from a group consisting of a set of superframes and a set of frames.

6. The method of claim 4, wherein determining at least one of the average interference metrics includes averaging the interference metric in one or more frames over a set of subcarriers.

7. The method of claim 4, wherein determining at least one of the average interference metrics includes measuring an interference level in a subband and averaging the interference level over a set of interlaces.

8. The method of claim 4, wherein determining the CDF includes generating a time distribution of an average measured interference over a set of frequency resources.

9. The method of claim 4, wherein the interference metric is selected from the group consisting of a signal-to-noise ratio, a signal-to-interference ratio, a signal-to-interference-and-noise ratio, and a capacity.

10. The method of claim 4, further comprising determining an effective interference metric, wherein the effective interference metric is determined by performing the following acts:

measuring a plurality of interference levels on a set of time-frequency resources;

evaluating a function ($f$) of an interference level (I) for each interference level in the plurality of measured interference levels and generating an average (A) of the evaluation results; and evaluating the inverse function of $f(i)$ with A as an argument value, and assigning a value of $f(A)$ to the effective metric interference.

11. The method of claim 10, wherein measuring a plurality of interference levels on a set of time-frequency communication resources includes one selected from the group consisting of measuring an interference level on each member of said set, and measuring an average interference function on a subset of said set.

12. The method of claim 10, wherein the function of an interference level is one of a capacity function or a signal-to-interference value.

13. The method of claim 10, further comprising receiving the nominal value, or extracting the nominal value from a measurement or a data storage.

14. The method of claim 4, further comprising receiving at least one of a reference interference value and threshold performance metric value.

15. The method of claim 4, wherein determining an interference level includes measuring the interference level on a subband.

16. The method of claim 8, wherein generating an OSI indication includes detecting a tail value of the CDF, the tail value indicating a percentile position in the CDF, and comparing the tail value to a threshold interference value.

17. The method of claim 10, wherein generating an OSI indication includes contrasting the effective performance metric with a threshold value.

18. The method of claim 4, wherein the OSI indication is transmitted in a dedicated forward link.

19. An apparatus used in wireless communications, comprising:

means for determining a fast interference level of a wireless system time-frequency communication resource based on an interference metric, wherein said determining includes determining a percentile position in a cumulative probability distribution function (CDF) of a plurality of average interference metrics of the system frequency resources, each of the average interference metrics based on a corresponding plurality of interference metrics, each of the interference metrics corresponding to a span in frequency over a given fast other-sector interference (OSI) time span;

means for generating an indication of fast OSI according to the fast interference level; and means for transmitting the generated OSI indication.

20. The apparatus of claim 19, further comprising:

means for determining a slow interference level based on an effective interference metric; and means for generating an indication of slow other-sector interference according to the slow interference level, wherein determining a slow interference level includes determining the effective interference metric, by determining a another percentile position in a CDF of a plurality of average interference metrics of the system time-frequency communication resources, each of the average interference metrics based on a corresponding plurality of interference metrics, each of the interference metrics corresponding to a span in frequency over a given slow OSI time span, longer than said fast OSI time span.

21. An electronic appliance that operates in a wireless communication environment, the appliance comprising:

an integrated circuit configured to facilitate measurements of an interference level of wireless communication resources in frequency-domain and time-domain, the measurements conducted at disparate time scales, to compute effective interference levels employing results of the measurements in slow and fast regimes, and to broadcast an indication of excessive other-sector interference; and a memory coupled to the integrated circuit to store measured and computed data, wherein the integrated circuit is further configured to compute the effective interference levels by determining a percentile position in a cumulative probability distribution function (CDF) of a plurality of average interference metrics of the wireless frequency resources, each of the average interference metrics based on a corresponding plurality of interference metrics, each of the interference metrics corresponding to a span in frequency over a given fast other-sector interference (OSI) time span.

22. The electronic appliance of claim 21, wherein the integrated circuit is further configured conduct the measurements at disparate time scales selected from the group consisting of a fast time scale and a slow time scale, and specified by a numerology of the wireless communication environment.

23. The electronic appliance of claim 21, wherein the integrated circuit is further configured to compute effective interference levels based on a capacity measure, and to trigger an excess OSI indication when the effective interference level exceeds a threshold.

24. The electronic appliance of claim 21, wherein the integrated circuit is further configured to compute averages of measured interference levels on time-frequency resources and to trigger an excess OSI indication when the average values surpass a threshold.

25. The electronic appliance of claim 21, the integrated circuit further configured to monitor a tail of a distribution of the CDF of the interference levels in time-domain, and to trigger an excess OSI indication when the tail values reach or exceed a threshold.

26. A method for controlling time-frequency resources of a wireless system, comprising
   determining a fast interference level of a system communication resource based on an interference metric, wherein said determining includes
      determining a plurality of average interference metrics of at least the system frequency communication resources, each of the average interference metrics based on a corresponding plurality of interference metrics, each of the interference metrics corresponding to a span in frequency over a given fast other-sector interference (OSI) time span, and
      determining a percentile position in a cumulative probability distribution function (CDF) of the plurality of average interference metrics;
   generating an indication of fast OSI according to the fast interference level; and
   transmitting the generated OSI indication.

27. The method of claim 26, further comprising:
   determining a slow interference level based on an effective interference metric; and
   generating an indication of slow other-sector interference according to the slow interference level, wherein
   determining a slow interference level includes determining the effective interference metric, by determining a another percentile position in a CDF of a plurality of average interference metrics of the system time-frequency communication resources, each of the average interference metrics based on a corresponding plurality of interference metrics, each of the interference metrics corresponding to a span in frequency over a given slow OSI time span, longer than said fast OSI time span.

28. A computer product having a non-transitory computer-readable medium having code for causing a computer to send control instructions to a wireless communication system having time-frequency communication resources, comprising:
   code for causing a computer to determine a plurality of average interference metrics of the system time-frequency communication resources, each of the average interference metrics based on a corresponding plurality of interference metrics, each of the interference metrics corresponding to a span in time-frequency;
   code for causing a computer to generate a cumulative probability distribution function (CDF) based on said plurality of average interference metrics;
   code for causing a computer to determine an interference level based on the CDF;
   code for causing a computer to generate an indication of other-sector interference (OSI) based on the determined interference level; and
   code for causing a computer to transmit the OSI indication.

29. The computer product of claim 28, wherein the code for causing a computer to generate the CDF includes code for causing a computer to generate a CDF of an average measured interference over a set of frequency resources.

30. The computer product of claim 29, wherein the code for causing a computer to generate the OSI indication includes code for causing a computer to detect a tail value of the CDF, the tail value indicating a percentile position in the CDF, and compare the tail value to a threshold interference value.

31. A computer product having a non-transitory computer-readable medium, having code for causing a computer to control time-frequency communication resources of a wireless system, the code comprising:
   code for causing a computer to determine a fast interference level of a system communication resource based on an interference metric, wherein determining a fast interference level includes
      determining a plurality of average interference metrics of at least the system frequency communication resources, each of the average interference metrics based on a corresponding plurality of interference metrics, each of the interference metrics corresponding to a span in frequency over a given fast other-sector interference (OSI) time span, and
      determining a percentile position in a cumulative probability distribution function (CDF) of the plurality of average interference metrics;
   code for causing a computer to generate an indication of fast OSI according to the fast interference level; and
   code for causing a computer to generate and transmit the generated OSI indication.

32. The computer product of claim 31, further comprising:
   code for causing a computer to determine a slow interference level based on an effective interference metric; and
   code for causing a computer to generate an indication of slow other-sector interference according to the slow interference level, wherein
   determining a slow interference level includes determining the effective interference metric, by determining a another percentile position in a CDF of a plurality of average interference metrics of the system time-frequency communication resources, each of the average interference metrics based on a corresponding plurality of interference metrics, each of the interference metrics corresponding to a span in frequency over a given slow OSI time span, longer than said fast OSI time span.

* * * * *